US010055776B2

(12) United States Patent
Nemery et al.

(10) Patent No.: US 10,055,776 B2
(45) Date of Patent: Aug. 21, 2018

(54) DECISION MAKING CRITERIA-DRIVEN RECOMMENDATIONS

(71) Applicants: Philippe Nemery, Shanghai (CN); Wen-Syan Li, Fremont, CA (US)

(72) Inventors: Philippe Nemery, Shanghai (CN); Wen-Syan Li, Fremont, CA (US)

(73) Assignee: SAP SE, Walldorf (DE)

(*) Notice: Subject to any disclaimer, the term of this patent is extended or adjusted under 35 U.S.C. 154(b) by 1034 days.

(21) Appl. No.: 13/959,049

(22) Filed: Aug. 5, 2013

(65) Prior Publication Data
US 2014/0379520 A1 Dec. 25, 2014

(30) Foreign Application Priority Data

Jun. 21, 2013 (CN) .......................... 2013 1 0250359

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0601* (2013.01); *G06Q 30/0623* (2013.01); *G06Q 30/0629* (2013.01); *G06Q 30/0641* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

| | | |
|---|---|---|
| 6,266,649 B1 | 7/2001 | Linden et al. |
| 7,412,202 B2 | 8/2008 | Gutta et al. |
| 7,681,140 B2 | 3/2010 | Ebert |

(Continued)

FOREIGN PATENT DOCUMENTS

EP 1573586 A2 9/2005

OTHER PUBLICATIONS

Dunford, R. R.; Decisions, Decisions; accessed via ProQuest. (Year: 1974).*
"k-means clustering", retrieved from: http://en.wikipedia.org/wiki/K-means_clustering, Oct. 27, 2013, 11 pages.
Brans, J., & Vincke, P. "A Preference Ranking Organization Method : The Promethee Method for Multiple Criteria Decision Making", Management Science, vol. 31, No. 6, Jun. 6, 1985, pp. 647-656.

(Continued)

*Primary Examiner* — Resha Desai
*Assistant Examiner* — Allison G Wood
(74) *Attorney, Agent, or Firm* — Brake Hughes Bellermann LLP

(57) ABSTRACT

The embodiments provide a system for decision-making criteria-based recommendations. The system may include a decision engine configured to receive a request for recommendations for an option problem associated with a product or service category, and determine options among a plurality of options for the product or service category based on preference information. The preference information may include activated decision-making criteria and corresponding weight values. The corresponding weight values may represent a relative importance of each activated decision-making criterion. The decision engine may be configured to determine options among the plurality of options including calculating scores for the plurality of options based on, in part, the activated decision-making criteria and the corresponding weight values and selecting the options among the plurality of options based on the calculated scores. The decision engine may be configured to provide a display of the determined options as the recommendations for the product or service category.

17 Claims, 15 Drawing Sheets

(56) References Cited

U.S. PATENT DOCUMENTS

| | | | |
|---|---|---|---|
| 7,761,345 B1* | 7/2010 | Martin | G06Q 10/087 |
| | | | 705/26.1 |
| 7,831,476 B2 | 11/2010 | Foster et al. | |
| 7,974,960 B2 | 7/2011 | Leidig | |
| 7,983,952 B1 | 7/2011 | Dillon | |
| 8,244,564 B2 | 8/2012 | Selinger et al. | |
| 8,301,585 B2 | 10/2012 | Mourey et al. | |
| 8,396,788 B2 | 3/2013 | Anke | |
| 2005/0108094 A1* | 5/2005 | Hugron | G06Q 30/02 |
| | | | 705/14.44 |
| 2005/0144086 A1* | 6/2005 | Speiser | G06F 17/30864 |
| | | | 705/26.62 |
| 2009/0077000 A1* | 3/2009 | Begole | G06Q 30/02 |
| | | | 706/54 |
| 2011/0131077 A1 | 6/2011 | Tan | |
| 2011/0154231 A1 | 6/2011 | Cherdron et al. | |
| 2012/0023122 A1 | 1/2012 | Gregov et al. | |
| 2012/0072462 A1* | 3/2012 | Gu | G06F 17/30572 |
| | | | 707/797 |
| 2013/0024313 A1 | 1/2013 | Dayal et al. | |
| 2013/0159057 A1* | 6/2013 | Hsiao | G06Q 30/0203 |
| | | | 705/7.32 |
| 2013/0211927 A1* | 8/2013 | Kellogg | G06N 7/00 |
| | | | 705/14.73 |

OTHER PUBLICATIONS

"Collaborative Filtering", retrieved from: http://en.wikipedia.org/wiki/Collaborative_filtering, Oct. 19, 2013, 8 pages.

* cited by examiner

DECISION MAKING CRITERIA-DRIVEN RECOMMENDATIONS

CROSS-REFERENCE TO RELATED APPLICATION

This application claims priority under 35 U.S.C. § 119 to Chinese Patent Application No. 201310250359.X, filed on Jun. 21, 2013, entitled "DECISION MAKING CRITERIA-DRIVEN RECOMMENDATIONS", which is incorporated herein by reference in its entirety.

BACKGROUND

Generally, the e-commerce sphere may be characterized by customers, suppliers, and e-retailers. The customers gather information about products and/or services which they eventually purchase on a website or in a physical store. The suppliers may include manufactures that produce the offered products and/or services, and the e-retailers may host e-commerce platforms that attract potential customers to propose various products and/or services provided by the suppliers.

In today's e-commerce environment, the customers have access to a relatively large amount of information in order to compare different existing offerings. The accessible information (e.g., provided by the e-retailers) may include intrinsic characteristics of the products and services, as well as reviews of experts, customer reviews, etc. Furthermore, the customers may receive recommendations about potential products/services that they should purchase. Usually, these recommendations are based on other user's purchases. However, spamming may occur if the user receives too much irrelevant advertisement. Also, current mechanisms do not necessarily collect all available information about the products or services into one centrally located place. Also, the presentation of the information is relatively ineffective such that comparisons among competing products or services may be difficult.

SUMMARY

The embodiments provide a system for decision-making criteria-based recommendations. The system may include at least one processor, and a non-transitory computer-readable storage medium including instructions executable by the at least one processor. The instructions may be configured to implement a decision engine. The decision may be configured to receive a request for recommendations for an option problem associated with a product or service category, and determine options among a plurality of options for the product or service category based on preference information. The preference information may include activated decision-making criteria and corresponding weight values. The decision-making criteria may represent factors for influencing a decision of at least one end user for the option problem or previous option problems. The corresponding weight values may represent a relative importance of each activated decision-making criterion. The decision engine may be configured to determine options among the plurality of options including calculating scores for the plurality of options based on, in part, the activated decision-making criteria and the corresponding weight values and selecting the options among the plurality of options based on the calculated scores. The decision engine may be configured to provide a display of the determined options as the recommendations for the product or service category.

The system may include a database configured to store a plurality of profiles associated with a plurality of end users, where each profile includes the preference information for one or more option problems. The preference information may include, for each option problem, the activated decision-making criteria, the corresponding weight values, and at least one applied filter. The system may include a recommendation determining unit configured to determine one of a personal recommendation scheme and a population-based recommendation scheme based on whether the end user is associated with a profile storing previous preference information associated with a previous option problem, a personalized recommendation unit configured to calculate the scores for the plurality of options based on, in part, activated decision-making criteria and corresponding weight values of at least one previous option problem associated with the end user according to the personal recommendation scheme when the recommendation determining unit determines the personal recommendation scheme, and a population-based recommendation unit configured to calculate the scores for the plurality of options based on, in part, the activated decision-making criteria and the corresponding weight values for the option problem of other end users when the recommendation determining unit determines the population-based recommendation scheme.

The population-based recommendation unit configured to calculate the scores for the plurality of options may include the population-based recommendation unit configured to select at least one filter having a frequency of usage over a first threshold value based on the preference information from the plurality of profiles. The population-based recommendation unit may be configured to select at least one activated decision-making criterion and corresponding importance category including computing a number of times each decision-making criterion has been activated, and selecting the at least one activated decision-making criterion having the number of times over a second threshold value. The population-based recommendation unit may be configured to calculate the scores for the plurality of options based on the selected at least one filter, the selected at least one activated decision-making criterion and the corresponding importance category.

The system may include an interaction processing unit configured to provide a display of a plurality of decision-making criteria in association with the determined options, where the interaction processing unit is configured to receive a selection of activated decision-making criteria among the plurality of decision-making criteria, and each activated decision-making criterion is assigned to an importance category among a plurality of importance categories. The system may include a personalized recommendation unit configured to calculate the scores for the plurality of options based on the activated decision-making criteria and the assigned importance categories, where the personalized recommendation unit is configured to select the options among the plurality of options based on the calculated scores.

The interaction processing unit configured to provide a display of a score associated with a particular option may include a transformation unit configured to translate the importance categories associated with the activated decision-making criteria into a plurality of weight values. The interaction processing unit may be configured to provide a display of an explanation of the score corresponding to the particular option in response to a score explanation selection including providing a display of the plurality of weight values, where the interaction processing unit is configured to receive an adjustment to at least one of the plurality of weight values. The personalized recommendation unit may be configured to re-compute the scores for the plurality of options based on the adjusted weight values and select the options among the plurality of options based on the re-computed scores.

The decision engine may be configured to compute a pairwise preference degree for each pair of options of the plurality of options for each decision-making criterion. The preference degree may represent a level of preference between a first option and a second option of each pair on each decision-making criterion. The decision engine may be configured to compute a uni-criterion score for each first option based on the preference degrees, compute a weighted global score for each first option based on the uni-criterion score and the corresponding weight value, rescale the weighted global score for each first option, and output the rescaled weighed global score for each option as the calculated scores for the plurality of options.

The decision engine may be configured to store the activated decision-making criteria and the corresponding weight values in a profile associated with the end user.

The decision engine may be configured to receive external factors that may influence the decision of the end user. The external factors may include at least one of location, weather, and promotions, and the decision engine may be configured to determine the options among the plurality of options based on the preference information and the external factors.

The system may include a database storing a plurality of profiles associated with a plurality of end users, each profile including the preference information for a respective end user, and an analytics unit configured to analyze the preference information of the plurality of profiles within product or service category including determining the factors relevant for influencing decisions of end users for the product or service category.

The system may include a database storing a plurality of profiles associated with a plurality of end users, each profile including the preference information for a respective end user, and a marketing manager unit configured to determine cross-product or cross-service recommendations for the end user based on the preference information. The marketing manager unit may be configured to determine a user-specific marketing message for the end user based on the preference information.

A non-transitory computer-readable medium storing instructions that when executed cause at least one processor to determine decision-making criteria-based recommendations. The instructions may include instructions to receive a request for recommendations for an option problem associated with a product or service category, determine options among a plurality of options for the product or service category based on preference information. The preference information may include activated decision-making criteria and corresponding weight values. The decision-making criteria may represent factors for influencing a decision of at least one end user for the option problem or previous option problems. The corresponding weight values may represent a relative importance of each activated decision-making criterion.

The instructions to determine options among the plurality of options may include instructions to calculate scores for the plurality of options based on, in part, the activated decision-making criteria and the corresponding weight values and select the options among the plurality of options based on the calculated scores, and provide a display of the determined options as the recommendations for the product or service category.

The instructions to calculate the scores for the plurality of options may include instructions to store a plurality of profiles associated with a plurality of end users. Each profile may include the preference information for one or more option problems. The preference information may include, for each option problem, the activated decision-making criteria, the corresponding weight values, and at least one applied filter. The instructions include instructions to determine one of a personal recommendation scheme and a population-based recommendation scheme based on whether the end user is associated with a profile storing previous preference information associated with a previous option problem. The instructions include instructions to calculate the scores for the plurality of options based on, in part, activated decision-making criteria and corresponding weight values of at least one previous option problem associated with the end user when the personal recommendation scheme is determined, and calculate the scores for the plurality of options based on, in part, the activated decision-making criteria and the corresponding weight values for the option problem of other end users when the population-based recommendation scheme is determined.

The instructions to calculate the scores for the plurality of options according to the population-based recommendation scheme include instructions to select at least one filter having a frequency of usage over a first threshold value based on the preference information from the plurality of profiles, select at least one activated decision-making criterion and corresponding importance category including computing a number of times each decision-making criterion has been activated, and selecting the at least one activated decision-making criterion having the number of times over a second threshold value, and calculate the scores for the plurality of options based on the selected at least one filter, the selected at least one activated decision-making criterion and the corresponding importance category.

The instructions to determine options among a plurality of options may include instructions to provide a display of a plurality of decision-making criteria in association with the determined options, and receive a selection of activated decision-making criteria among the plurality of decision-making criteria, where each activated decision-making criterion is assigned to an importance category among a plurality of importance categories. The instructions include instructions to calculate the scores for the plurality of options based on the activated decision-making criteria and the assigned importance categories, and select the options among the plurality of options based on the calculated scores.

The instructions to determine options among a plurality of options include instructions to provide a display of a score associated with a particular option, and translate the importance categories associated with the activated decision-making criteria into a plurality of weight values, provide a display of an explanation of the score corresponding to the particular option in response to a score explanation selection including providing a display of the plurality of weight values, receive an adjustment to at least one of the plurality of weight values, re-compute the scores for the plurality of options based on the adjusted weight values, and select the options among the plurality of options based on the re-computed scores.

The instructions may include instructions to store a plurality of profiles associated with a plurality of end users, where each profile includes the preference information for a respective end user, and analyze the preference information of the plurality of profiles within product or service category including determining the factors relevant for influencing decisions of end users for the product or service category.

The instructions may include instructions to store a plurality of profiles associated with a plurality of end users, each profile including the preference information for a respective end user, and determine cross-product or cross-service recommendations for the end user based on the preference information.

The embodiments may provide a computer-implemented method for decision-making criteria-based recommendations. The method may include receiving a request for recommendations for an option problem associated with a product or service category, and determining options among a plurality of options for the product or service category based on preference information. The preference information may include activated decision-making criteria and corresponding weight values. The decision-making criteria may represent factors for influencing a decision of at least one end user for the option problem or previous option problems. The corresponding weight values may represent a relative importance of each activated decision-making criterion. The method may include calculating scores for the plurality of options based on, in part, the activated decision-making criteria and the corresponding weight values and selecting the options among the plurality of options based on the calculated scores, and providing a display of the determined options as the recommendations for the product or service category.

The calculating the scores for the plurality of options may include storing a plurality of profiles associated with a plurality of end users. Each profile may include the preference information for one or more option problems. The preference information may include, for each option problem, the activated decision-making criteria, the corresponding weight values, and at least one applied filter. The method may include determining one of a personal recommendation scheme and a population-based recommendation scheme based on whether the end user is associated with a profile storing previous preference information associated with a previous option problem, calculating the scores for the plurality of options based on, in part, activated decision-making criteria and corresponding weight values of at least one previous option problem associated with the end user when the personal recommendation scheme is determined, and calculating the scores for the plurality of options based on, in part, the activated decision-making criteria and the corresponding weight values for the option problem of other end users when the population-based recommendation scheme is determined.

The details of one or more implementations are set forth in the accompanying drawings and the description below. Other features will be apparent from the description and drawings, and from the claims.

DETAILED DESCRIPTION

Figure 1:
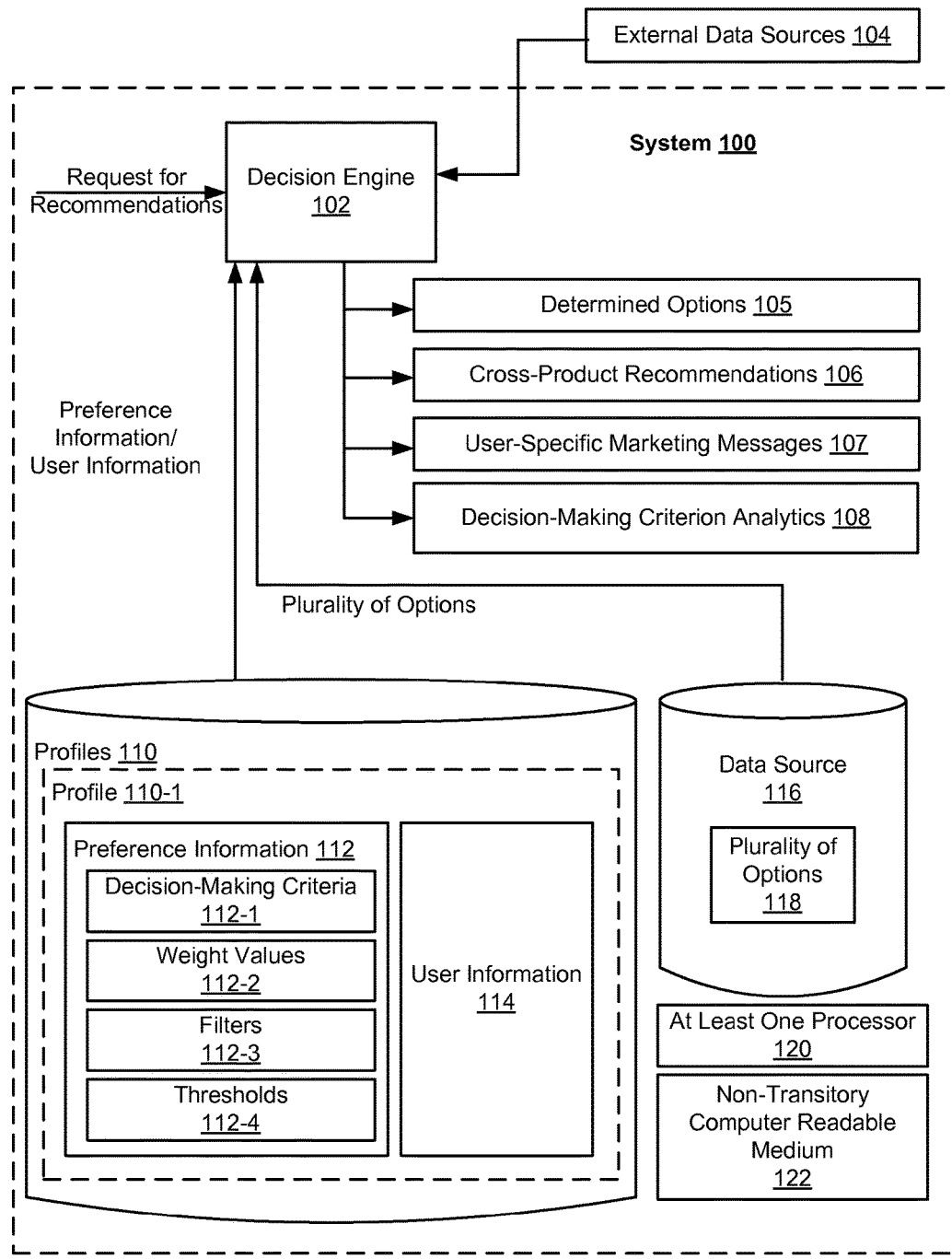
FIG. 1 illustrates a system for decision-making criteria based recommendations according to an embodiment.

The embodiments provide a system that captures information about the factors taken into account when making decisions/purchases for products/services. In one example, decision-making criteria related to finding a particular restaurant may include customer reviews, price, neighborhood, quality of food, location, and/or promotions. In another example, the decision-making criteria related to purchasing an automobile may include price, length/width, number of cylinders, number of doors, color, etc. Generally, the decision-making criteria may represent factors for influencing a particular decision of the end user for choosing a product/service. When searching for a particular service/product, some of these decision-making criteria may be more important to the end user than others. For example, when the end user is a business person searching for a particular restaurant to entertain clients, the price and the promotions may be relatively less important as compared to the quality of food and the customer reviews.

According to the embodiments, the system may present decision-making criteria related to a particular service/product category to the end user and permit the end user to activate and categorize one or more decision-making criteria into different importance categories (e.g., most important, medium important, less important). The system may transform the assigned importance categories of the activated decision-making criteria into weight values representing a relative importance of each activated decision-making criterion.

Then, the system may retrieve a plurality of filtered/non-filtered options (e.g., the possible product/services for purchase) for the product/service category, and may calculate a score for each of these options based on the activated decision-making criteria and corresponding weight values. In one particular example, the system may provide the top 10/20/30 options with the highest calculated score on a display (e.g., also the displayed options may be integrated with a mapping application to provide the location of each displayed option) for consideration by the end user.

Along with the identification of the top options, the system may provide the corresponding calculated score, and as well as a detailed display of the weight values associated with the activated decision-making criteria. This detailed display of the weight values may provide the user with concrete information on how the score was computed. The user may interact with the displayed weight values by changing its weighting (e.g., increase the weight associated with price, location, etc. by using a sliding scale). Then, the system may automatically update the calculated score, and provide the updated list of options.

Upon selection of a particular product/service, the system may save the preference information (e.g., the activated decision-making criteria, associated weight values, any applied filters, and thresholds) in a profile associated with the end user. The profile may include other information about the user such as background information (e.g., gender, occupation, age, etc.). Generally, for each option problem (and for each end user), the system may save this preference information which captures information regarding the actual factors that influenced the end user for selecting a particular product/service.

When the same end user wishes to search for another product/service (e.g., related to the same product/service category or a different product/service category), the system may leverage the saved preference information in the end user's profile for making recommendations. Further, the system may leverage the preference information for other users for making product/service recommendations. In one example, for determining recommendations for end user A, the system may determine profiles for other similarly situated end users B and C (e.g., end users A, B, C may relate to common profiles associated with business persons), and then compute the scores for the options to be considered by end user A based on the preference information (e.g., the decision-making criteria, associated weight values, applied filters, and thresholds) from the saved profiles associated with end users B and C.

As a result, the database that stores the profiles may contain valuable information in terms of information about the factors (and importance of the factors) for influencing the users' decisions about their selection/purchases.

The captured preference information may be analyzed and summarized for trends and insights for the suppliers of the products/services. For example, the system may analyze the profiles containing the preference information, and perform decision-making criteria analytics. The decision-making criteria analytics may produce a report on a particular product/service category (e.g., automobiles) that explains the factors for influencing users' decisions regarding the product/service category. For example, the report may identify the factors and their relative importance when making a decision, the differences between the different segments of the population, and/or how a specific brand or product of a supplier is perceived/ranked compared to other brands.

Also, the system may analyze the profiles containing the preference information, and determine cross-product recommendations and user-specific marketing messages for any type of marketing campaign. These and other features are further explained with reference to the figures.

FIG. 1 illustrates a system 100 for decision-making criteria based recommendations according to an embodiment. For example, the system 100 may include a decision engine 102, a database storing profiles 110 (including an example profile 110-1), data source 116 storing information about a plurality of options 118, at least one processor 120, and a non-transitory computer readable medium 122. The non-transitory computer readable medium 122 may include instructions, that when executed by the at least one processor 120, are configured to implement the components and/or functionalities of the system 100 including the decision engine 102, as further described below.

The non-transitory computer readable medium 122 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Besides storing executable instructions, the non-transitory computer-readable medium 122 may also store any type of database structure discussed herein including the database storing the profiles 110 and the data source 116. Alternatively, the profiles 110 and/or the data source 116 may be associated with a system outside the system 100 having the decision engine 102, and the information associated with the profiles 110 and the data source 116 may be accessed by the decision engine 102. The at least one processor 120 may include any type of special purpose logic circuitry, e.g., an FPGA (field programmable gate array) or an ASIC (application-specific integrated circuit).

The data source 116 may store the plurality of options 118. The plurality of options 118 may include information regarding the products/services that are recommended through the system 100. Each option 118 may represent a particular service or product. As such, the data source 116 may store all the products/services and associated data that may be offered via the system 100. For example, for each option 118, the data source 116 may identify the particular product or service and contain information about the product or service such as its name, location, category (e.g. whether it is a restaurant, automobile, etc.), telephone number, and characteristics about the option 118 such as price, quality, size, etc. The characteristics about the option 118 may widely vary depending on the category of the product/service. For example, for automobile options, the characteristics may include color, number of cylinders, price, size, wheelbase, weight, displacement, number of doors, etc. However, for restaurant options, the characteristics may include price, quality, seating capacity, location, delivery options, etc.

In one example, external data sources 104 may include information regarding weather, location-based information, customer reviews of the options 118, and/or promotions of the options 118. Generally, the external data sources 104 may represent any type of third party source that stores information relevant to making a purchase (e.g., weather, location-based information), and information concerning the specific product/service such as the customer reviews that may be maintained by an outside system.

The database storing the profiles 110 may store the profiles 110 associated with a plurality of end user associated with the system 100. Each profile 110 may correspond to a different end user registered with the system 100. FIG. 1 illustrates an example profile as the profile 110-1 pertaining to a particular user. However, it is noted that the profiles 110 may include any number of profiles, which may be hundreds or thousands of profiles 110.

The profile 110-1 may include preference information 112 and user information 114. The user information 114 may include any type of demographical data associated with the user such as age, gender, occupation, etc. Also, the user information 114 may include behavioral or browsing data (e.g., number of visits on the website associated with the system 100) associated with the end user, and transactional data such as the number of purchased items, total amount spent, products purchased, etc.

According to the embodiments, the preference information 112 may include, for each option problem, activated decision-making criteria 112-1, corresponding weight values 112-2, filters 112-3, and thresholds 112-4 associated with the end user of the profile 110-1. An option problem may be the situation of searching for a particular option 118 among the plurality of options 118 within a service/product category. For example, when a user logs into the system 100, searches the plurality of automobile options, and decides on a particular automobile, this process may be referred to as an option problem. Then, when the end user performs another search for automobile options (or a different category such as restaurant options), and decides on a particular automobile or restaurant, this process may be referred to as a separate option problem. Then, the profile 110-1 may store the preference information 112 for each option problem performed by the end user associated with the profile 110-1.

The activated decision-making criteria 112-1 may represent factors taken into account when making a decision/purchase for a product/service within an option problem. In one example, the activated decision-making criteria 112-1 related to finding a particular restaurant may include customer reviews, price, neighborhood, quality of food, location, and/or promotions. In another example, the activated decision-making criteria 112-1 related to purchasing an automobile may include price, length/width of automobile, number of cylinders, number of doors, color, etc. Generally, the activated decision-making criteria 112-1 may represent factors for influencing a particular decision of the end user for choosing a product/service, and may vary depending on the type of option problem. When a decision-making criterion is selected by the user (e.g., assigned to an importance category), it is considered an activated decision-making criterion 112-1.

Generally, for each category of product/service, a list of decision-making criteria may be predefined by the system 100. For example, with respect to automobiles, the list of decision-making criteria may include the same criterion for each option problem as it relates to automobiles. However, as explained later in the disclosure, one or more decision-making criteria from the list of decision-making criteria may be activated, and the activated decision-making criteria may be stored/saved in the profile 110-1 as the activated decision-making criteria 112-1.

The weight values 112-2 may represent the weight/significance of the activated decision-making criteria 112-1. For example, each activated decision-making criterion 112-1 may be associated with a weight value 112-2, where the weight value 112-2 may represent a relative importance of the corresponding activated decision-making criterion 112-1. As explained later in the disclosure, the activated decision-making criteria 112-1 may be assigned to important categories representing importance levels. For example, the list of decision-making criteria related to a particular service/product category may be presented to the end user, and, upon activation of one or more decision-making criteria, the activated one or more decision-making criteria 112-1 may be categorized into different importance categories (e.g., most important, medium important, less important). The assigned importance categories of the activated decision-making criteria 112-1 may be transformed into the weight values 112-2 representing a relative importance of each activated decision-making criterion 112-1.

Also, it is noted that instead of storing the weight values 112-2, the profile 110-1 may store the assigned importance categories. Then, at a time when the weight values 112-2 are required, the stored importance categories may be transformed into the weight values. In another embodiment, the profile 110 may store both the weight value 112-2 and the importance category for each activated decision-making criterion 112-1.

The filters 112-3 may include information identifying one or more filters that were applied to the plurality of options 118 for a particular option problem. For example, with respect to the restaurant option problem, the plurality of options 118 provided to the decision engine 102 may represent filtered options that have been filtered according to restaurant type (e.g., Chinese food or western-style food), location, and/or price range (e.g., between 10 and 50 dollars). As such, a particular filter 112-3 may specify the type of filter that was applied and its filter settings. Besides the specific example provided above, the filters 112-3 may include any type of searching constraint, which may widely vary pending on the context of the product/service category. As such, for each option problem, the filters 112-3 may specify the filters that were utilized, and, for each filter, it may specify the type of filter and its filter settings.

The thresholds 112-4 may include preference and/or indifference thresholds for the activated decision-making criterion 112-1. For example, a preference and/or indifference threshold may be provided for a particular activated decision-making criterion 112-1. In one specific example, if price is one of the activated decision-making criteria 112-1, the indifference and preference thresholds may be $20 and $40, respectively. This means that restaurants whose price ranges differ from less than $20 are considered similar (e.g., indifferent threshold). On the other hand, if there is a difference of $40 between price menus of two restaurants, then the cheaper restaurant is preferred (e.g., preference threshold).

The decision engine 102 may receive a request for recommendations for an option problem that is associated with a product or service category. The decision engine 102 may determine options 105 among the plurality of options 118 (e.g., the plurality of options 118 may represent the filtered/non-filters options for the relevant product/service category) based on, in part, the preference information 112. For example, the decision engine 102 may receive a request for recommendations from the end user associated with the profile 110-1. The request may be for recommendations for products/services within a product/service category. In one specific example, the request may be related to recommendations for restaurants, or the request may be related to recommendations for automobiles.

The decision engine 102 may receive the plurality of filtered/non-filtered options 118 from the data source 116 pertaining to the request. For example, the decision engine 102 may query and receive the plurality of options 118 relating to restaurants in response to the request. In this context, the plurality of options 118 may represent all (or substantially all) of the filtered/non-filtered restaurants associated with the system 100.

Then, the decision engine 102 may analyze the plurality of options 118, and determine at least a subset of the plurality of options 118 (e.g., the top 10/20/30 options) as the determined options 105 based on the preference information 112 in the profile 110-1 associated with the end user that prompted the request, and/or the preference information 112 associated with one or more profiles 110 for other end users.

If the profile 110-1 does not specify the preference information 112 (e.g., it is the user's first time using the system 100), the decision engine 102 may determine product/service recommendations based on the preference information 112 for other end users. This recommendation scheme may be referred to as a population-based recommendation scheme. If the profile 110-1 does specify the preference information 112 (either for a previous option problem relating to the same product/service category, or for a previous option problem relating to a different product/service category), the decision engine 102 may determine product/service recommendations based on the stored preference information 112 associated with the profile 110-1 for the current end user. This recommendation scheme may be referred to as a personalized recommendation scheme.

In order to obtain the determined options 105 from the many available options 118 (according to the population-based recommendation scheme or the personalized recommendation scheme), the decision engine 102 may calculate scores for the plurality of options 118 based on, in part, the decision-making criterion 112-1 and the corresponding weight values 112-2. For instance, the decision engine 102 may calculate a score for each option 118 of the plurality of options 118, where the score represents the relevancy of the corresponding option 118, e.g. a relatively high score will be highly relevant to the end user. Further, the decision engine 102 may utilize the filters 112-3, the thresholds 112-4, the user information 114, as well as another other type of information associated with the system 100 (e.g., the external data sources 104) for calculating the scores for the plurality of options 118. Then, the decision engine 102 may select the options 105 among the plurality of options 118 based on the calculated scores. In one example, the decision engine 102 may select the options 105 with the highest scores, e.g., the options 105 having the top 10/20/30 scores.

In addition, apart from providing recommendations to end users, the decision engine 102 may determine cross-product or cross-service recommendations 106 based on the preference information 112. For example, as indicated above, the database may store a plurality of profiles for a number of end users. Each profile may store the previous information for one or more option problems. Then, for each user of a specified global population, the decision engine 102 may determine the cross-product or cross-service recommendations 106 based on the captured preference information 112. Then, the decision engine 102 may perform an action notifying the end user of the recommendation such as sending an email, display an advertisement, etc. In addition, using the preference information 112, the decision engine 102 may determine user-specific marketing messages 107. For example, the decision engine 102 may tailor the content of the marketing messages to the preferences specified by the user. These features are further explained with reference to FIG. 9.

Figure 2:
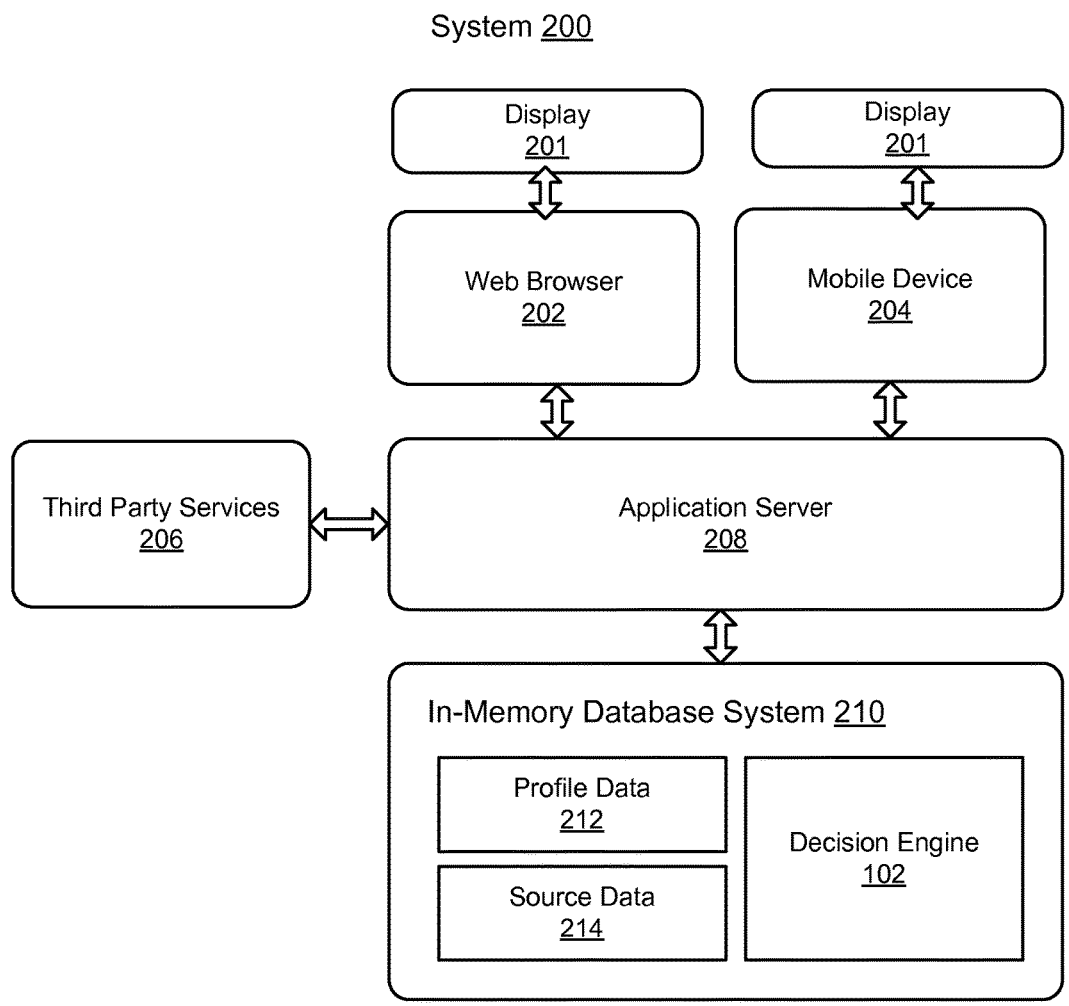
FIG. 2 illustrates a system for implementing the system of FIG. 1 according to an embodiment.

FIG. 2 illustrates a system 200 for implementing the system 100 of FIG. 1 according to an embodiment. For example, the system 200 may include an application server 208 interfacing with a web browser 202 and a mobile device 204. Each of the web browser 202 and the mobile device 204 may be associated with its own display 201. The application server 208 may host a recommendation tool (e.g., a website) that is provided to a plurality of end users via the web browser 202 and the mobile device 204.

Also, the system 200 may include an in-memory database system 210 and third party services 206. The third party services 206 may represent the external data sources 104. The application server 208 may interface with the third party services 206 in order to obtain the information regarding weather, location-based information, customer reviews of the options 118, and/or promotions of the options 118. In one example, the logic of the decision engine 102 may be pushed down to the database level via in-memory database technology. However, it is envisioned that the logic of the decision engine 102 may be incorporated into the application server 208.

The in-memory database system 210 may include the decision engine 102, profile data 212, and the source data 214. The source data 214 may represent the data source 116 of FIG. 1 storing the plurality of options 118. The profile data 212 may represent the database storing the profiles 110 including the profile 110-1. The in-memory database system 210 may be a type of database management system that relies on main memory for computer data storage. In contrast, conventional database systems employ a disk storage mechanism. Also, the in-memory database system 210 may support supports real-time analytics and transactional processing including replication and aggregation techniques. In one embodiment, the in-memory database system 210 may be HANA Enterprise 1.0 (any other versions) that is developed by SAP.

Figure 3:
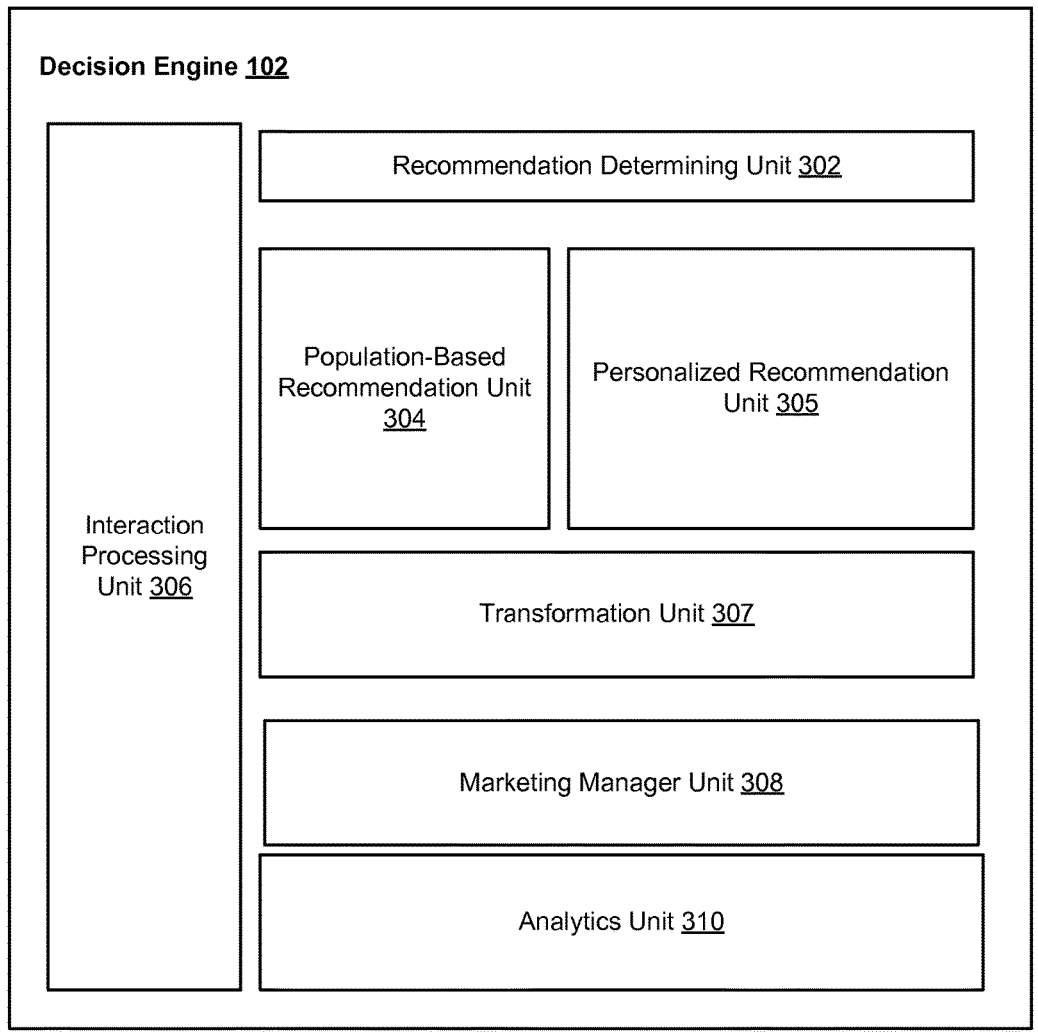
FIG. 3 illustrates a decision engine of FIG. 1 according to an embodiment.

FIG. 3 illustrates the decision engine 102 according to an embodiment. Referring to FIG. 3, the decision engine 102 may include a recommendation determining unit 302 configured to determine a recommendation scheme (e.g., population-based recommendation scheme or personalized recommendation scheme), a population-based recommendation unit 304, a personalized recommendation unit 305, an interaction processing unit 306, a transformation unit 307, a marketing manager unit 308, and an analytics unit 310.

Referring to FIG. 3, the recommendation determining unit 302 may receive a request for recommendations for an option problem associated with a particular product/service category, and determine which recommendation scheme to use (e.g., one of the personal recommendation scheme and the population-based recommend scheme) based on whether the end user is associated with a profile 110 storing the preference information 112 for a previous option problem. For example, the recommendation determining unit 302 may determine whether the end user who issued the request is logged into the system 100 for the first time. If so, the end user does not have any stored preference information 112 associated with its profile 110. In this case, the recommendation determining unit 302 determines that the population-based recommendation scheme should be utilized.

In this situation, the population-based recommendation unit 304 may be configured to calculate the scores for the plurality of options based in, in part, the decision-making criterion 112-1 and the corresponding weight values 112-2 for the same option problem, but for other end users. In this case, when an end user connects for the first time, the system 100 does not contain information related to the preference information 112 (however, it may contain some user information 114). In order to provide the end user with some recommendations, the population-based recommendation scheme may be used. In one example, with respect to the option problem relating to locating a restaurant, the population-based recommendation unit 304 may analyze the preference information 112 for other end users who have searched and located restaurants, and then calculate the scores for the plurality of options 118 based on this preference information 112.

If the recommendation determination unit 302 determines that the end user is associated with a profile 110 storing the preference information 112 for one or more previous option problems, the personalized recommendation unit 305 may be configured to calculate the scores for the plurality of options 118 based on, in part, the decision-making criterion 112-1 and the corresponding weight values 112-2 of the one or more previous option problems for the end user. In summary, the scoring for the plurality of options 118 is based on the personalized recommendation scheme or the population-based recommendation scheme depending on the end user's previous connections to the system 100.

The decision engine 102 (through the interaction processing unit 306) may provide the determined options 105 to the end user via the display 201, as well as provide any type of information determined by the system 100. Further, the interaction processing unit 306 may process user interactions with the display information, and provide any updated information to the other units for further processing. The more specific operations of the interaction processing unit 306 are explained with reference to FIGS. 4 and 5.

The transformation unit 307 may be configured to transform the importance categories (e.g., one or more activated decision-making criteria may be associated to an importance category) into weight values (and vice versa). The details of the transformation unit 307 are further explained with reference to FIGS. 6A and 6B.

The marketing manager unit 308 may be configured to determine cross-product recommendations 106 and the user-specific marketing messages 107. For example, for each user of a specified global population, the marketing manager unit 308 may determine the cross-product or cross-service recommendations 106 based on the captured preference information 112. Then, the marketing manager unit 308 may perform an action notifying the end user of the recommendation such as sending an email, display an advertisement, etc. In addition, using the preference information 112, the marketing manager unit 308 may determine user-specific marketing messages 107. For example, the marketing manager unit 308 may tailor the content of the marketing messages to the preferences specified by the user. The details of the marketing manager unit 308 are further explained with reference to FIG. 9.

The analytics unit 310 may be configured to analyze the preference information 112 contained in the profiles 110, and generate a variety of different reports. Generally, the generated reports may provide information regarding what factors are most important to users such as the factors and relative importance when making a decision.

In particular, the captured preference information 112 may be analyzed and summarized for trends and insights for the suppliers of the products/services. For example, the analytics unit 310 may analyze the profiles 110 containing the preference information 112, and perform decision-making criteria analytics 108. In one example, the decision-making criteria analytics 108 may produce a report on a particular product/service category (e.g., automobiles) that explains the factors for influencing users' decisions regarding the product/service category (see FIG. 10). However, generally, the analytics unit 310 may produce any type of report that summarizes the captured decision-making criteria 112-1, the corresponding weights 112-2, and the applied filters 112-3, in the profiles 110 for the end users. In some examples, the report may identify the factors and their relative importance when making a decision (see FIG. 10), the differences between the different segments of the population (see FIG. 11), and how a specific brand or product of a supplier is perceived/ranked compared to other brands (see FIG. 12).

Figure 4:
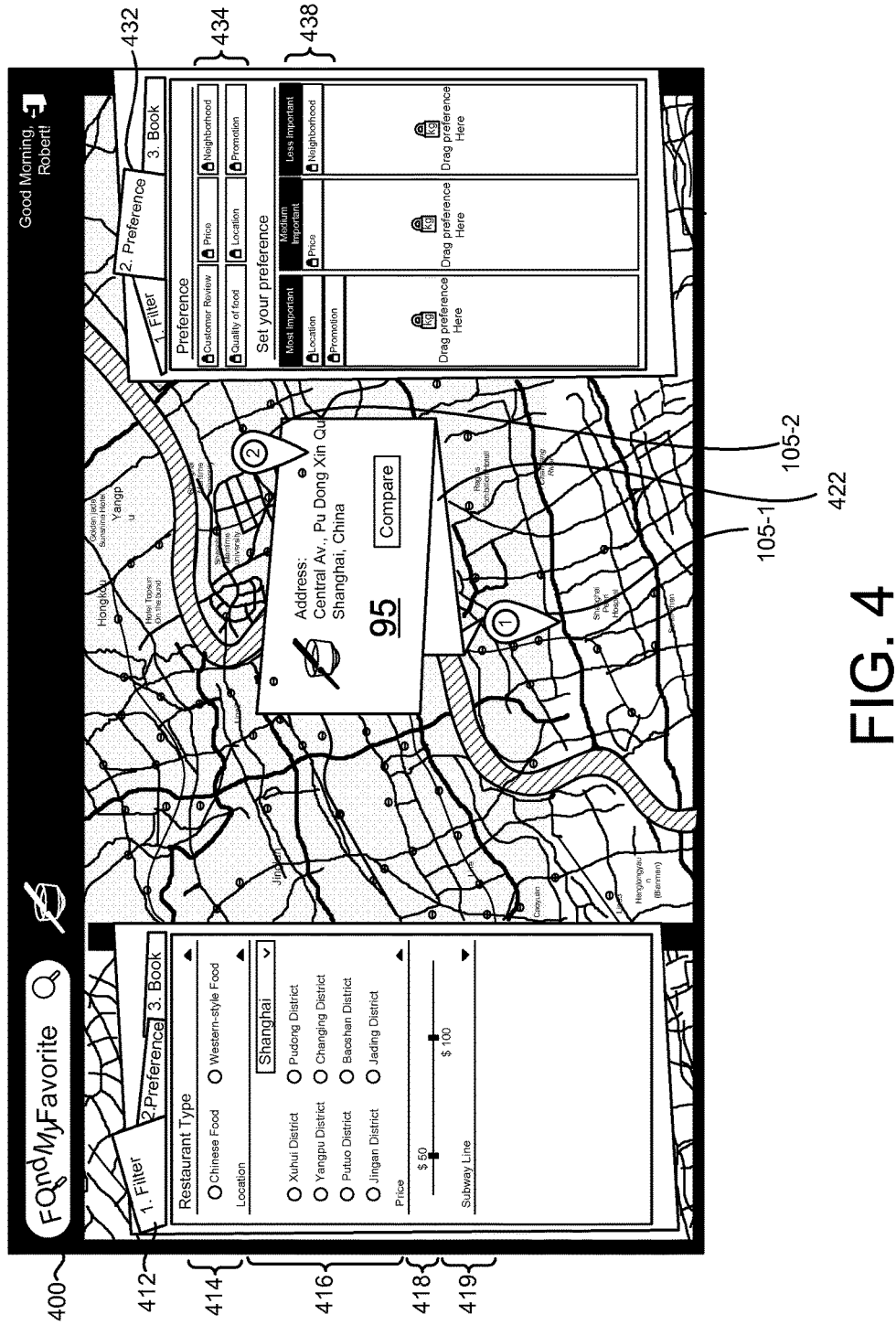
FIG. 4 illustrates an example screen shot produced by the system of FIG. 1 providing an example of activated decision-making criteria and calculated score for a determined option according to an embodiment.

FIG. 4 illustrates a screen shot 400 of the display 201 providing an example of the activated decision-making criterion 112-1 and calculated score for a determined option 105 according to an embodiment.

Referring to FIG. 4, initially, when the end user connects for the first time to the system 100, the decision engine 102 (e.g., the population-based recommendation unit 304) may provide the determined options 105 though the interacting processing unit 306 as recommendations to the end user via the display 201, as shown in FIG. 4. In this example, two options 105 related to restaurant recommendations are provided to the end user for consideration—first option 105-1 and a second option 105-2. However, the population-based recommendation unit 304 through the interaction processing unit 306 may provide any number of determined options 105 via the display 201. Further, the recommendation tool of FIG. 4 is integrated with a mapping application that provides a geographical view so that the end user can see the locations of the determined options 105.

The calculated score is associated with each determined option 105. The decision engine 102 may provide only the options 118 with the highest calculated score as the determined options 105, which may be the top 5, 10, 15 options. The scoring depends on whether the recommendation scheme is the personalized recommendation scheme or the population-based recommendation scheme, both of which will be explained in detail later in the disclosure.

Referring to FIG. 4, in one example, the user may hover or click on the indicator associated with one of the determined options 105 (e.g., the second option 105-2), and the interaction processing unit 306 may provide a score summary 422 associated with the determined option 105. The score summary 422 may provide the calculated score, the name, address, contact information, as well as any other information associated with the determined option 105. In this example, the score summary 422 for the second option 108-2 provides the name, address, and calculated score (95) of the restaurant. Also, the score summary 422 may provide a compare feature, which, upon activation, may provide a score report providing a detailed explanation of the weighting of the activated decision-making criteria, as described with reference to FIG. 5A.

The end user may be able to change the calculated scores based on his/her preferences, e.g., setting the filters 412 and the activating decision-making criteria 438. For example, on the left panel, the filters 412 may be set. The filters 412 may include any type of commonly known filter options for sorting through the possible options 118 such as price, location, etc. The type and specifics of the filters 412 may widely vary depending on the kind of option problem. For example, the filters 412 associated with the selection of a restaurant may be substantially different than the filters 412 associated with the selection of an automobile.

Accordingly, by using the filters 412, the end user may filter the options 118 (e.g. location, type of food, price range, etc.). In this specific example, the filters 412 may include a restaurant type filter 414 (e.g., Chinese food or Western-style food), a location filter 416, a price range filter 418, and a subway line filter 419. After the end user makes a selection, the decision engine 102 may save the applied filters 412 as the filters 112-3 in the profile 110 associated with the end user.

On the right panel, the interaction processing unit 306 may provide a preference selection area 432 on the display 201. It is noted that the preference selection area 432 and the filters 412 may be tabs located within the context of the application. As such, the arrangement of the preference selection area 432 on the right panel and the filters 412 on the left panel are for discussion purposes only. In one example, the collection of these tabs may be in one area of the display 201 (e.g., left/right/top/bottom etc.), where the user may bring one of these tabs to the foreground by clicking on 1. Filter, 2. Preference, or 3. Book, for example. The preference selection area 432 may include a list 434 of the decision-making criteria that is relevant for the type of product/service category. In this example, the list 434 may include customer review, price, neighborhood, quality of food, location, and promotion. However, the list 434 of the decision-making criteria may widely differ depending on the context of the option problem.

The interaction processing unit 306 may receive a selection of activated decision-making criteria 438 among the list 434, and, optionally, ranking information associated with at least two activated decision-making criteria 438. Each activated decision-making criterion 438 may be assigned to an importance category among a plurality of importance categories. The ranking information may represent a ranking of two or more activated decision-making criteria 438 when the activated decision-making criteria 438 are assigned within a single importance category. In this case, the activated decision-making criteria 438 related to location and promotion have been assigned to the most important category, the activated decision-making criteria 438 related to price has been assigned to the medium important category, and the activated decision-making criteria related to neighborhood has been assigned to the less important category.

In particular, the end user may select one or more decision-making criteria 438 from the list 434 by assigning a decision-making criterion to one of the importance categories. The importance categories may represent different levels of importance to the user, and may include categories such as most important, medium important, and less important, for example. However, the importance categories may include any number of categories. In one specific example, the end user may drag and drop a decision-making criterion into one of the importance categories. As such, the end user may select the criteria that he/she considers as important for making his/her decision.

As such, based on the user's interactions with the preference selection area 432, the interaction processing unit 306 may receive the selection of the activated decision-making criteria 438 and its assigned importance categories, as well as the ranking information. The interaction processing unit 306 may receive the ranking/scoring information when two or more activated decision-making criteria 438 are assigned within a single importance category. Accordingly, the ranking information may specify the rank of the activated decision-making criteria 438 within the single importance category.

The assigned importance categories associated with activated decision-making criteria 438 and the ranking/scoring information may determine the weighting in terms of weights values. In order to obtain the weight values, transformation unit 307 may transform the assigned importance categories associated with activated decision-making criteria 438 and the ranking information into weight values. Each weight value may represent a relative importance of a respective activated decision-making criterion 438. The details of the transformation of importance categories to weight values (and vice versa) are explained with reference to FIGS. 6A and 6B.

Although not illustrated in FIG. 4, other information can be specified as well such as the thresholds (e.g. indifference and preference thresholds) for the activated decision-making criteria 438. However, according to one embodiment, the decision engine 102 may also determine (infer) the thresholds according to any type of known statistical techniques.

Then, based on the preference information (e.g., applied filters, activated decision-making criteria and corresponding weight values, thresholds, etc.), the personalized recommendation unit 305 may compute a score for each of the plurality of options 118. For example, initially, the population-based recommendation unit 304 or the personalized recommendation unit 305 may calculate the initial scores for the plurality of options 118 and determine at least a subset of the plurality of options 118 as the determined option 105. Then, based on the weight values obtained from the transformation unit 307, the personalized recommendation unit 305 may update the scores for the plurality of options 118 and provide the updates results to the display 201. In a further embodiment, the end user may view a detailed explanation of the scoring, change one or more weight values associated with the activated decision-making criteria, and view of the updated results, as further explained with reference to FIG. 5A.

Figure 5A:
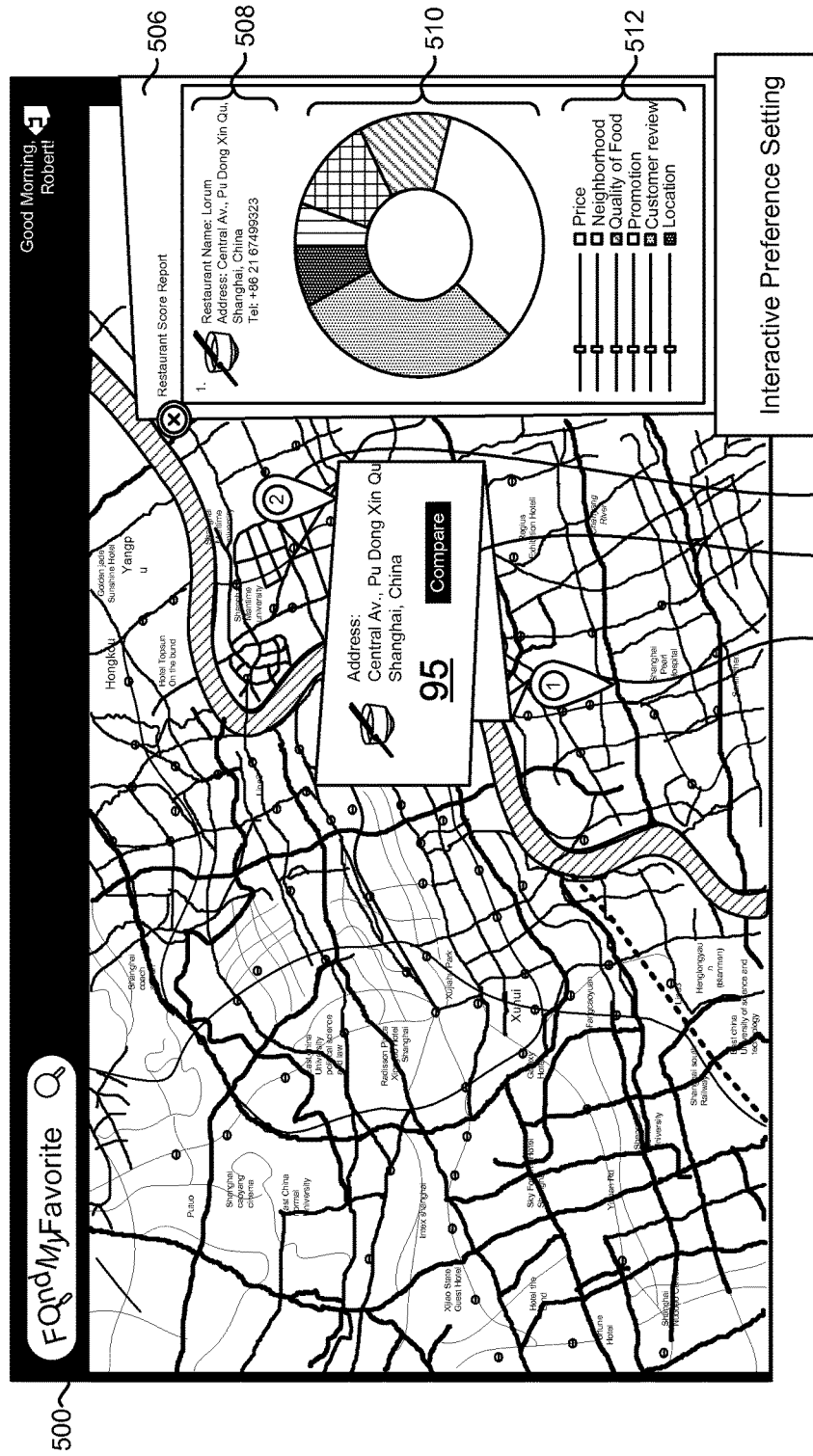
FIG. 5A illustrates an example screen shot produced by the system of FIG. 1 providing an example of a score report for the calculated score according to an embodiment.
Figure 5B:
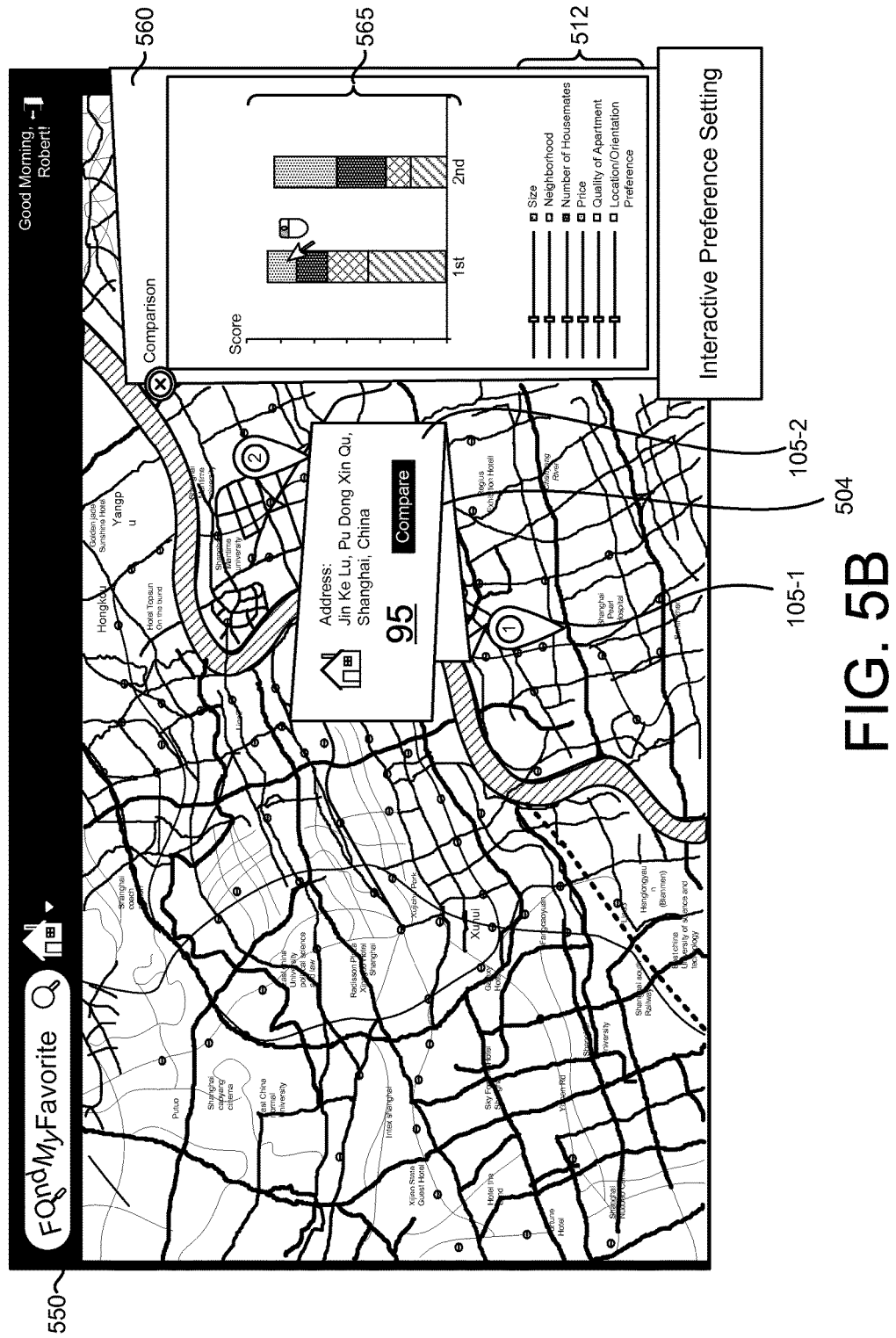
FIG. 5B illustrates an example screen shot produced by the system of FIG. 1 providing an example of a comparison report that compares the weighted scores on the different criteria of two or more options according to an embodiment.

FIG. 5A illustrates a screen shot 500 of the display 201 providing an example of a score report 506 for the calculated score according to an embodiment. For example, upon activation of the compare feature in the score summary 504, the interaction processing unit 306 may provide a display of the score report 506. Further, upon activation of the compare feature in the score summary 504 (or another selection control in FIG. 5A or 5B), the interaction processing unit 306 may provide a comparison report 560 as shown in FIG. 5B.

Referring to FIG. 5A, the score report 506 may provide an explanation of the score corresponding to a particular determined option 105 including providing a display of the plurality of weight values. For example, as shown in FIG. 5A, upon receipt of a score explanation selection (e.g., activation of the compare button) associated with the second option 105-2, the interaction processing unit 306 may provide the score report 506.

The score report 506 may include identification information 508 indicating the determined option 105, a visual indicator 510 illustrating the percentage (or amount) of weight associated with each of the activated decision-making criteria, and a setting adjustor 512 that permits the end user to adjust the weighting applied to the activated decision-making criteria.

The identification information 508 may identify the name, address, and contact information associated with the second option 105-2. The visual indicator 510 may include any type of diagram, graph, or chart that illustrates the percentage (or amount) of weight associated with each of the activated decision-making criterion. For example, the visual indicator 510 may allow the end user to easily understand the weighting associated with the activated decision-making criteria. The setting adjustor 512 may include any type of user interaction control that permits the end user to adjust the weighting. In the specific example of FIG. 5A, a sliding scale is used as the setting adjustor 512. However the setting adjustor 512 may include other types of user interaction controls such as radio buttons, fields providing the actual weight values, etc.

According to the embodiments, as the user adjusts the weights via the setting adjustor 512, the interaction processing unit 306 in conjunction with the transformation unit 307 may automatically update the visual indicator 510, and the personalized recommendation unit 305 may dynamically change the scores, which may affect which of the determined options 105 are displayed. This makes the recommendation completely transparent to the user. By using the setting adjustor 512, the end user can change the values of the weights in order to perform a what-if analysis and to analyze the sensitivity of the scoring.

Eventually, the end user will eventually make a booking or a purchase based on the received personal recommendation. Then, the preference information 112 (e.g., the activated decision-making criteria 112-1, corresponding weights 112-2, applied filters 112-3, and thresholds 112-4) may be saved as the preference information 112 in the profile 110 associated with the end user. Also, it is noted that the preference information 112 may be saved in the profile 110 associated with the end user without actually making a purchase. For example, the decision engine 102 may save the preference information 112 in the profile 110 when the user logs out of the system 100.

FIG. 5B illustrates a screen shot 550 of the display 201 providing an example of the comparison report 560 according to an embodiment. For example, upon activation of a selection control (e.g., the compare feature), the interaction processing unit 306 may provide the comparison report 560. The comparison report 560 may include a comparison graph 565 providing the difference between two or more options 105 (e.g., first option 105-1 and the second option 105-2) in terms of their calculated scores broken down by percentage of decision-making criteria 112-1.

The comparison graph 565 may include any type of diagram, graph, or chart that illustrates the percentage (or amount) of weighted score associated with each of the activated decision-making criterion for the compared options. For example, the comparison graph 565 shows the percentage of the weighted score for the decision-making criteria 112-1 used for the calculated score for the first option 105-1, and the percentage of the weighted score for the decision-making criteria 112-1 used for the calculated score for the second option 105-2. The comparison graph 565 may allow the end user to easily understand the weighted scores associated with the activated decision-making criteria for two or more options. The setting adjustor 512 may include any type of user interaction control that permits the end user to adjust the weighting. In the specific example of FIG. 5A, a sliding scale is used as the setting adjustor 512. However the setting adjustor 512 may include other types of user interaction controls such as radio buttons, fields providing the actual weight values, etc. The setting adjustor 512 permits the user to change the weights for the whole option problem. Then, the comparison graph 565 illustrates the weighted score for each option, and includes information that explains how each option performs on each criterion, which takes into account the weight of the criterion defined by the setting adjustor 512.

As one can see, this interactive recommendation given to the user is based on his/her preferences. This is clearly a distinctive feature compared to other recommendation systems. Furthermore, this preference information 112 is saved for each user and for each option problem. This means that this preference information 112 can be re-used for subsequent (real-time or batch-mode) marketing actions.

Also, the system 100 may perform real-time automatic updates for account for new information. For example, the system 100 may easily process new data regarding the current option problem such as distance to the user location (e.g., from a mobile phone), discounts, weather, etc. Then, the personalized recommendation unit 305 may update the recommended scores/ranks of the different options 118 when the end user reconnects to the system 100. Also, the decision engine 102 may transmit a special notification to the user to indicate if any information has changed since his/her last option problem.

Furthermore, new options may be easily added to the system 100. The decision engine 102 may automatically include the new option(s) into the system 100. In this context, it is noted that no training or warm-up phase is required, solely the objective information about the new option. Based on the preference information 112 initially provided by the user, the objective information can be transformed to a personal rank/scoring. Further, new option problems can be easily added to the system. Since the administrator of the system 100 can specify initial similarities between different option problems, the preference information 112 for one option problem can be transferred to another option problem. This 'transfer' can indeed be updated by the users' behavior.

Figure 6A:
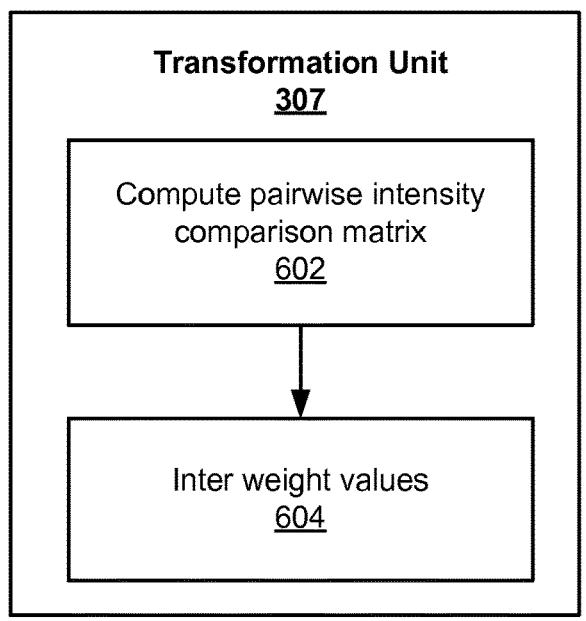
FIG. 6A illustrates example operations of a transformation unit transforming importance categories into weight values according to an embodiment.

FIG. 6A illustrates example operations of the transformation unit 307 according to an embodiment. For example, the transformation unit 307 may transform the importance categories (e.g., most important, medium important, less important) into weight values. Also, the user can subsequently adjust the weight values by means of the setting adjustor 512 to perform one or more 'what-if' analysis scenarios.

A pairwise intensity comparison matrix of the weights may be computed (602). For example, the transformation unit 307 may compute a pairwise comparison matrix A, where each element $a_{ij}$ corresponds to the intensity of importance of the decision-making criterion i over decision-making criterion j. The higher this intensity, the higher the importance of that decision-making criterion i over the decision-making criterion j. By construction, each element may be represented by $a_{ij}$ with the following constraint:

$$a_{ij} = \frac{1}{a_{ji}}.$$

The transformation unit 307 may use the following table in computing the weight values from the importance categories.

TABLE 1

| Intensity of Importance | Definition |
|---|---|
| 1 | Equal Importance |
| 2 | Weak Importance |
| 3 | Moderate Importance |
| 4 | Moderate Plus Importance |
| 5 | Strong Importance |
| 6 | Strong Plus Importance |
| 7 | Very Strong or Demonstrated Importance |
| 8 | Very, Very Strong Importance |
| 9 | Extreme Importance |

In one example, the transformation unit 307 may compute the intensity as 4 for all the decision-making criteria of category 1 (e.g., most important) compared to category 2 (e.g., medium important). The transformation unit 307 may compute the intensity as 4 for all of the decision-making criteria of category 2 (e.g., medium important) compared to category 3 (e.g., less important). The transformation unit 307 may compute the intensity as 8 for all of the decision-making criteria of category 1 (e.g., most important) compared to category 3 (e.g., less important).

For the pair of the decision-making criteria i, j of a same category (but with a different rank), the transformation unit 307 may compute the intensity as follows:

Difference_rank_ij = rank_i − rank_j
If(1<=Difference_rank_ij<8):

$$a_{ji} = (\text{Difference\_rank\_ij} + 1) \text{ and } a_{ij} = \frac{1}{a_{ji}}$$

ElseIf (Difference_rank_ij>=8):

$$a_{ji} = 8 \text{ and } a_{ij} = \frac{1}{8}$$

ElseIf (Difference_rank_ij<-8)

$$a_{ij} = 8 \text{ and } a_{ji} = \frac{1}{8}$$

Else $$a_{ij} = (\text{Difference\_rank\_ij} + 1) \text{ and } a_{ji} = \frac{1}{a_{ij}}$$

It is noted that the above example utilizes three different categories. However, the embodiments may utilize any number of importance categories. Furthermore, the maximum intensity comparison value (set to here 9) can also be changed by the system administrator.

Table 2 illustrates an example of the received ranking information and the assignment of the decision-making criterion (e.g., Criterion 1 to Criterion 5) to the importance categories.

TABLE 2

|  | Very Important (Category 1) | Medium Important (Category 2) | Less Important (Category 3) |
|---|---|---|---|
| Rank 1 | Criterion 1 | Criterion 3 | Criterion 4 |
| Rank 2 | Criterion 2 |  | Criterion 5 |
| Rank 3 |  |  |  |

Table 3 illustrates an example of the pairwise importance matrix computed by the transformation unit 307.

TABLE 3

|  | Criterion 1 | Criterion 2 | Criterion 3 | Criterion 4 | Criterion 5 | Total |
|---|---|---|---|---|---|---|
| Criterion 1 | 1 | 2 | 4 | 8 | 8 | 23 |
| Criterion 2 | 0.5 | 1 | 4 | 8 | 8 | 21.5 |
| Criterion 3 | 0.2 | 0.2 | 1 | 4 | 4 | 9.4 |
| Criterion 4 | 0.125 | 0.125 | 0.25 | 1 | 2 | 3.5 |
| Criterion 5 | 0.125 | 0.125 | 0.25 | 0.5 | 1 | 2 |
|  |  |  |  |  | Total: | 66.242 |

Weight values may be inferred (604). For example, the transformation unit 307 may infer the weight values from element $a_{ij}$ which correspond to the intensity of importance of decision-making criterion i over decision-making criterion j. For example, the transformation unit 307 may sum the elements of the row i of A as follows:

$$r_i = \Sigma_j a_{ij} \qquad \text{Eq. (1)}$$

Then, the transformation unit 307 may normalize the sums of the rows to obtain the weight values $w_i$ as follows:

$$w_i = \frac{r_i}{\sum_i r_i} \qquad \text{Eq. (2)}$$

Also, it is noted that another method may be used to inter the weight values. For example, the weight values can be mapped to the eigenvalues of matrix A. Table 4 provides an example of the inferred weight values of Table 3.

TABLE 4

| Criteria | Relative Values (5) |
|---|---|
| Criterion 1 | 0.387205 (23/66.42) |
| Criterion 2 | 0.361953 |
| Criterion 3 | 0.158249 |
| Criterion 4 | 0.058923 |
| Criterion 5 | 0.03367 |

The following is an example of the Pseudo code for the transformation of importance categories into weight values according to an embodiment.

```
Let us assume that there are q criteria.
criterion_i ← {Category_i, Rank_i}
Matrix A ← 0
Total_Sum←0
For i=1 to q with step 1:
    Sum_Row_i←0
    For j=1 to q with step 1:
        Aij←0
        If (i = j) then Aij=1 --the intensity of criterion_i to itself is 1.
            Else
                If(Category_ i != Category_ j) --
                criteria of different categories
                    If(Category_ i=1, Category_j=2): Aij←4
                    If(Category_ i=1, Category_j=3): Aij←8
                    If(Category_ i=2, Category_j=3): Aij←4
                Else--The criteria belong to the same category
                    DR_i_j←rank_i − rank_j
                    If(1<= DR_i_j <8):
                        Aij←(DR _i_j + 1)
                    ElseIf (Difference_rank_ij>=8):
                        Aij←8
                    ElseIf (Difference_rank_ij<-8):
                        Aij←1/8
                    Else
                        Aij←1/(DR_i_j+1)
        Sum_Row_i← Aij+ Sum_Row_i
    Total_Sum← Total_Sum+Sum_Row_i
```

```
For i=1 to q with step 1:
    Weight_crit_i=Sum_Row_i / Total_Sum
```

Figure 6B:
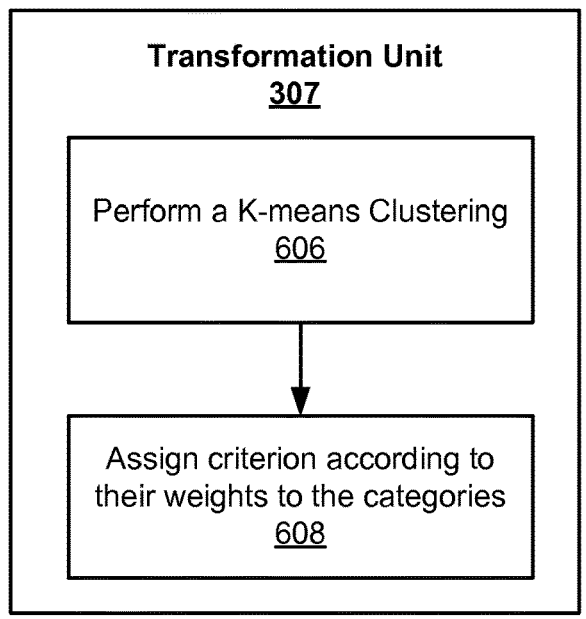
FIG. 6B illustrates example operations of the transformation unit transforming the weight values back to importance categories.

Also, the transformation unit 307 may transform the weight values to the importance categories. FIG. 6B illustrates example operations of the transformation unit 307 that transforms the weight values back to importance categories.

A K-means clustering may be performed (606). For example, the transformation unit 307 may perform a K-means clustering on the relative weight values while imposing K=3, i.e. 3 clusters. However, the number of clusters (K) may encompass any type of value. The values of the centroids may be ordered. In one example, the transformation unit 307 may assign the elements of the cluster corresponding to the highest centroid, to Category 1. The order (rank) of the criteria inside this cluster corresponds to the order of their weights.

Also, the transformation unit 307 may assign the elements of the cluster corresponding to the lowest centroid, to Category 3. The order of the criteria inside this cluster corresponds to the order of their weights. Further, the transformation unit 307 may assign the remaining criteria to Category 2 with a rank corresponding to the order on their weight values. The advantage of this procedure is that the criteria will be spread over the three categories, and there will always be at least one criterion for each category.

Alternatively, based on the two predefined thresholds ($\Delta_{1-2}$=0.30; $\Delta_{2-3}$=0.10), the transformation unit 307 may assign the criteria according to their weights to the categories with a rank corresponding to the order on their weight values.

After the transformation unit 307 computes the corresponding weight values, the personalized recommendation unit 305 may score the plurality of options 118. For example, the personalized recommendation unit 305 may be configured to calculate the scores for the plurality of options 118 based on, in part, the decision-making criterion 112-1 and the corresponding weight values 112-2.

Figure 7:
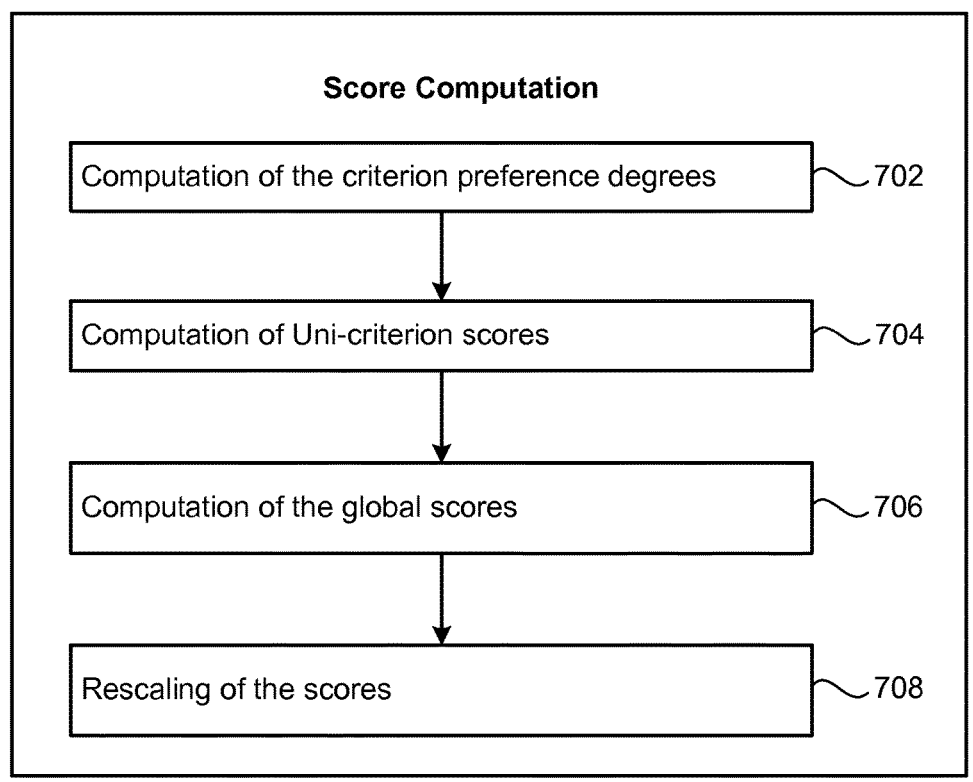
FIG. 7 illustrates example operations of a score computation procedure performed by the various components of the decision engine according to an embodiment.

FIG. 7 illustrates example operations of a score computation procedure performed by the various components of the decision engine 102 including the personalized recommendation unit 305 according to an embodiment.

Based on the transformed weight values, the personalized recommendation unit 305 may compute a score for each non-filtered option 118 while considering the activated decision-making criteria 112-1. The calculations performed by the personalized recommendation unit 305 may be based on the PROMETHEE method where the weights, indifference and preference threshold have been already determined.

For example, O={$o_1$, $o_2$, . . . , $o_n$} may represent set of options 118 to be scored, and F={$f_1$, $f_2$, . . . , $f_m$} may represent the activated decision-making criterion 112-1. Without any loss of generality, it is assumed that all criteria are maximized (e.g. customer review value). Furthermore, $f_i(o_j)$ represents the evaluation of option $o_j$ on criterion $f_i$, and that $f_i(o_j)$ is a numeric value. The mapping can be defined by the system administrator.

Criterion preference degrees may be computed (702). For example, a pairwise preference degree may be computed for each ordered pair of options i,j on criterion k: $P_{ij}^k$. This preference degree reflects how better an option $o_i$ is compared to option $o_j$ on criterion k. $P_{ij}^k$ is always between 0 and 1. The preference degrees may be computed as follows:

$$P_{ij}^k = \begin{cases} 0 & \text{if } f_k(o_i) - f_k(o_j) \leq q \\ [f_k(o_i) - f_k(o_j) - q]/[p - q] & \text{if } q < f_k(o_i) - f_k(o_j) < p \\ 1 & \text{if } f_k(o_i) - f_k(o_j) \geq p \end{cases} \quad \text{Eq. (3)}$$

The parameters q, p correspond to the indifference and preference thresholds. These parameters may be inferred from the data as follows:

$$q=0.15*(\text{max\_evaluation\_on\_crit\_}k-\text{min\_evaluation\_on\_crit\_}k) \quad \text{Eq. (4)}$$

$$p=0.85*(\text{max\_evaluation\_on\_crit\_}k-\text{min\_evaluation\_on\_crit\_}k) \quad \text{Eq. (5)}$$

Uni-criterion scores may be computed (704). For example, the uni-criterion score $\phi^k(o_i)$ for each option $o_i$ may be computed as follows:

$$\phi^k(o_i) = \frac{\sum_{j=1}^{n} P_{ij}^k - P_{ji}^k}{n-1} \quad \text{Eq. (6)}$$

Global scores may be computed (706). For example, the weighted global score (e.g., between −1 and 1) may be computed for each option $o_i$ as follows:

$$\Phi(o_i) = \Sigma_{k=1} w_k * \phi^k(o_i), \quad \text{Eq. (7)}$$

where $w_k$ represents the weight associated to criterion k.

The scores may be rescaled (708). For example, the score for each option may be rescaled as follows:

$$\Phi*(o_i) = \left(\frac{\Phi(o_i)+1}{2}\right) * 100 \quad \text{Eq. (8)}$$

This enables to avoid negative scores which might not be 'user'-understandable. The decision engine 102, through the interaction processing unit 306, may provide only the options 118 with the highest calculated score as the determined options 105, which may be the top 5, 10, 15 options.

In addition, the interaction processing unit 306 may process other user interactions such as the adjustment of the weighting values as shown in FIGS. 5A and 5B. For example, referring to FIG. 5A, as the user adjusts the weights via the setting adjustor 512, the interaction processing unit 306 (in conjunction with the transformation unit 307) may automatically update the visual indicator 510, and the personalized recommendation unit 305 may dynamically change the scores based on the score algorithm explained with reference to FIG. 7, which may affect which of the determined options 105 are displayed. This makes the recommendation completely transparent to the user. By using the setting adjustor 512, the end user can change the values of the weights in order to perform a what-if analysis and to analyze the sensitivity of the scoring.

After the user is satisfied with the selection, the preference information 112 may be saved to the profile 110 associated with the end user. For example, the decision engine 102 may be configured to save the decision-making criterion 112-1, the weight values 112-2, the filters 112-3, and the thresholds 112-4 in the profile 110.

Figure 8:
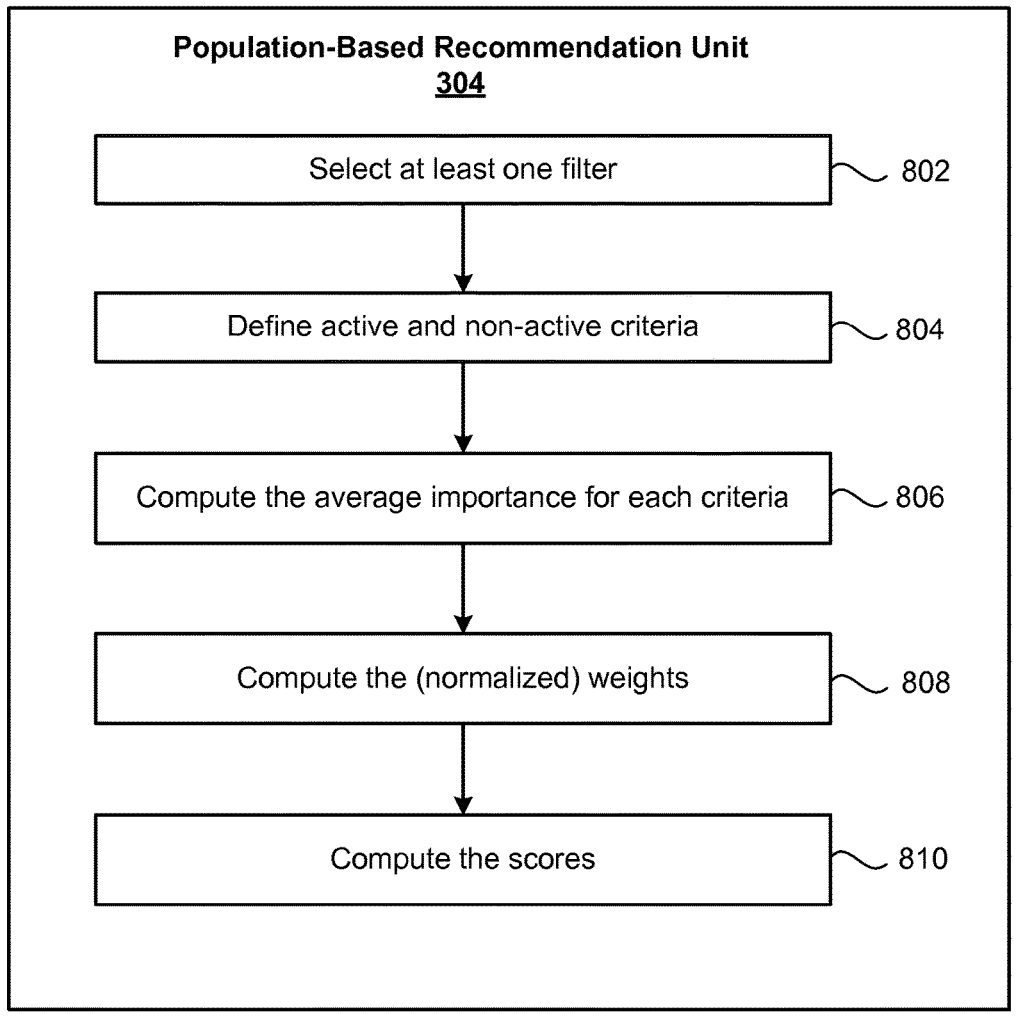
FIG. 8 illustrates example operations of a population-based recommendation unit according to an embodiment.

FIG. 8 illustrates example operations of the population-based recommendation unit 304 according to an embodiment. For example, when the end user connects for the first time, the system 100 may not include at least the preference information 112 about the user. In order to provide him with some recommendation, the population-based recommendation unit 304 may perform the population-based recommendation scheme to the scores for the plurality of options 118 based in, in part, the decision-making criterion 112-1 and the corresponding weight values 112-2 for the same option problem, but for other end users.

At least one filter may be selected (802). For example, the population-based recommendation unit 304 may select one or more filters having a frequency of usage over a threshold value based on the preference information 112 from profiles 110 of other end users. For example, the population-based recommendation unit 304 may select the most frequently-used filters and corresponding values (e.g., relative frequency over a threshold value such as greater than 50%). Next, only the non-filtered decision-making criterion will be considered as follows.

Active and non-active criterion may be defined (804). For example, the population-based recommendation unit 304 may be configured to select one or more decision-making criteria (e.g., the non-filtered criteria) and their corresponding importance categories including computing a number of times each decision-making criterion have been activated, and selecting the decision-making criteria having the number of times over a threshold value. For example, for each decision-making criterion, the population-based recommendation unit 304 may compute the proportion of times a certain decision-making criterion has been activated by end users. If this proportion is greater than a certain threshold (e.g. >50%), the population-based recommendation unit 304 considers these decision-making criterion in the next operation.

The average importance for each selected criteria may be computed (806). For example, for each selected decision-making criterion, the population-based recommendation unit 304 determines an average importance category. In other words, the population-based recommendation unit 304 may compute, for each active criterion, the average importance of each criterion (given by all the users).

The weights may be computed (808). For example, the population-based recommendation unit 304 may compute the weight values from the average importance categories using the algorithm explained in FIG. 6A. The scores may be computed (810). For example, the population-based recommendation unit 304 may compute the scores using the algorithm explained with reference to FIG. 7.

It is noted that the first real-time recommendation is based on the global population or on a specific segment (e.g. students, family, business man . . . ) provided by the user when logging in. As the preference information 112 (filters, activated criteria, corresponding weights, and thresholds) is saved for every user, a population or segment based preference mapping can be inferred (by existing statistical techniques) and used for the scoring.

Figure 9:
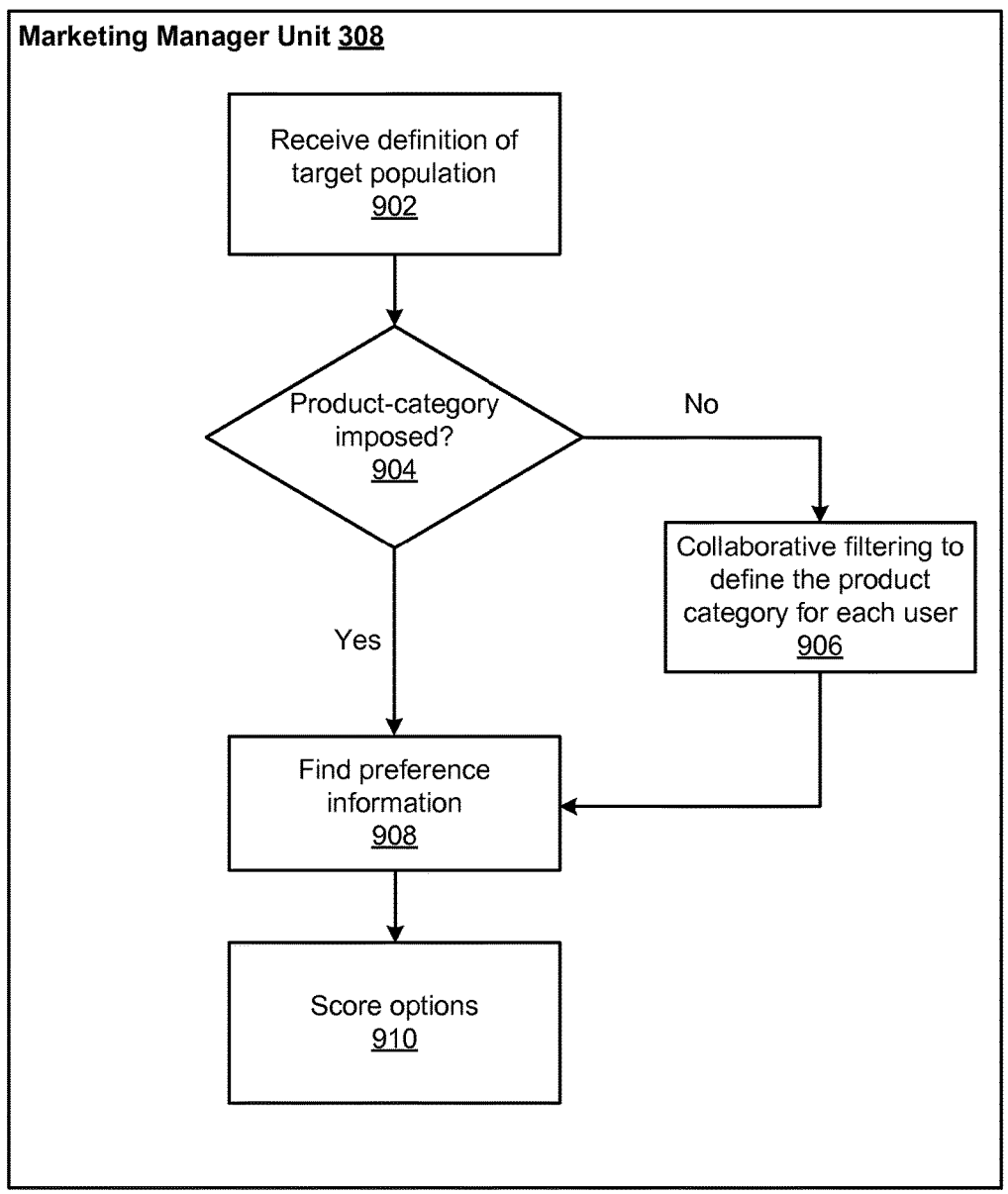
FIG. 9 illustrates example operations of a marketing manager unit according to an embodiment.

FIG. 9 illustrates example operations of the marketing manager unit 308 according to an embodiment. For example, the marketing manager unit 308 may be configured to determine cross-product recommendations 106 and user-specific marketing messages 107.

Definition of the target population may be received (902). For example, the marketing manager unit 308 may receive the definition of the target population such as a class of users. In particular, the marketing manager unit 308 may receive a definition pertaining to a certain group of user such as business people, family, students, etc.

A determination is made whether or not a product-category is imposed (904). For example, the marketing administrator may choose a product category, or the marketing manager unit 308 makes use of collaborative filtering methods to infer which product categories might be relevant for the specific users based on the population's interest in several products.

If the marketing manager unit 308 does not receive an explicit product category, collaboration filtering may be used to define the product for each end user (906). Collaborative filtering means that if a high proportion of users have purchased two products/services of categories A and B, then the marketing manager unit 308 may recommend the category B to the users who have only purchased a product of category A and inversely. It is noted that the collaborative filtering method may recommend a category of product/service (as opposed to a specific product/service). However, marketing manager unit 308 may define the specific option (product/service) from the inferred category, as explained below.

Preference information may be retrieved or computed (908). For example, for each user within the defined population, the marketing manager unit 308 may define the corresponding preference information from their profiles 110. For example, the preference information of a user (who will be recommended an option of the defined/inferred category) may include the filters 112-2 (however, the filter information may be optional), the activated decision-making criteria 112-1, and the weight values 112-3 (or the weight categories). For explanation purposes, the preference information of the user who will be recommended an option of the defined/inferred category is denoted by Y.

In one example, marketing manager unit 308 determines whether users have already chosen a product from the product category. If the user has already chosen products from the product category, the marketing manager unit 308 may retrieve the preference information 112 from previously saved option problems. In one example, the marketing manager unit 308 may average the preference information 112.

In another example, the marketing manager unit 308 may determine that an end user has not chosen a specific product from the product category, but has made a selection for another option problem (denoted by X). As such, there are users who have made the choice X and Y. Then, the marketing manager unit 308 may find the most similar users regarding the preference information for option problem X. If the similarity is acceptable, the marketing manager unit 308 may impute the preference information 112 of these similar users for option problem Y. If the similarity is not high enough, the process proceeds as explained below.

If the similarity is not high enough (or there are no users who have made the choice for the product types X and Y), the marketing manager unit 308 may perform one of the following analyses.

First, in the set of previous option problems stored in the profile 110, the marketing manager unit 308 may determine an option problem Z such that the decision-making criteria can be mapped for the option problem X. For example, the option problem relating to the location of restaurant and the option problem relating to the choice of a bar may include a set of similar decision-making criteria, e.g., location, distance, quality of service, price of menus, and promotions, and type of establishment. In this case, the marketing manager unit 308 may import the preference information 112 for the option problem Z (e.g., which contains similar decision-making criterion to option problem X) as the preference information for the option problem X.

Second, the marketing manager unit 308 may determine that an option problem Z (e.g., similar situated option problem) does not exist in the previous option problems for the end user. In this case, the marketing manager unit 308 may locate an option problem (regardless of the user) that is similar to option problem X, and impute the preference information 112 for the option problem D of the global population or of a certain segment (e.g., students) by averaging the preference values and assigning them to the user.

Options may be scored (910). For example, the marketing manager unit 308 may be configured to calculate the scores for the options 118 based on the preference information obtained in operation 1108 using the scoring algorithm in FIG. 7, and recommend one or more of the highest scored options from category Y.

As such, based on the scoring, the marketing manager unit 308 may determine the cross-product recommendations 106 for an end user. Then, the marketing manager unit 308 may perform an action notifying the end user of the recommendation such as sending an email, display an advertisement, etc. In addition, using the preference information 112, the marketing manager unit 308 may determine user-specific marketing messages 107. For example, the marketing manager unit 308 may tailor the content of the marketing messages to the preferences specified by the user. Examples of different marketing messages for different users with different preferences may include:

Example 1

Hi Robert,

This week, we suggest a delightful spicy hot soup in Restaurant XXX. All menu selections will receive a discount of 10%. After you dinner, enjoy the lively neighborhood of district XX with its bars.

Example 2

Hi Marc,

This week, we suggest a delightful western menu in Restaurant YYY. This restaurant has received excellent customer reviews. After your dinner, enjoy a walk in the quiet neighborhood of Century Park.

For example, based on the activated decision-making criteria 112-1 and the corresponding weight values 112-2, the marketing manager unit 308 may determine which factors are important for a specific user, and then automatically design user-specific marketing messages 107.

Figure 10:
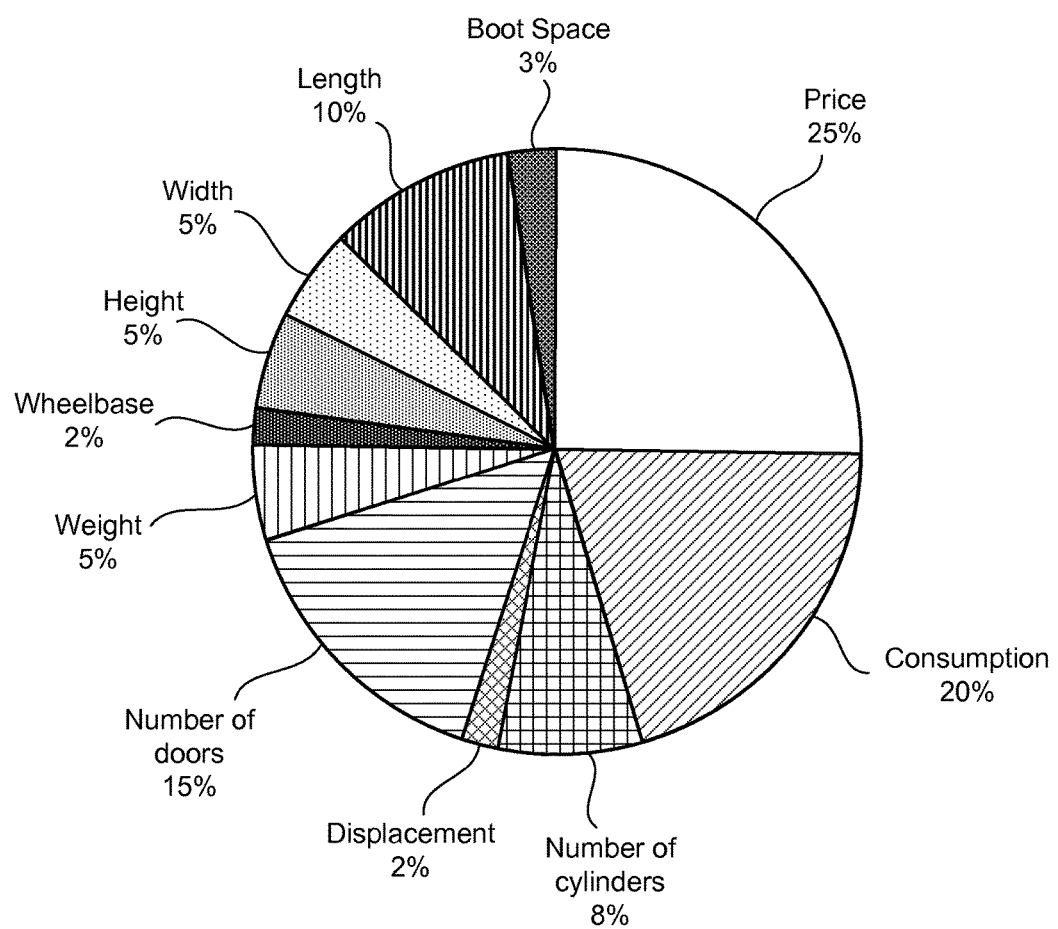
FIG. 10 illustrates an example report generated by an analytics unit according to an embodiment.

FIG. 10 illustrates an example report generated by the analytics unit 310 according to an embodiment. For example, analytics unit 310 may be configured to analyze the preference information 112 contained in the profiles 110, and generate a variety of different reports. Generally, the generated reports may provide information regarding what factors are most important to users such as the factors and relative importance when making a decision.

In this specific example, the analytics unit 310 analyzed the preference information 112 by examining the percentage of usage for the filters 112-3. For example, the report provides the amount of usage of the applied filters 112-3 when searching for an automobile. Therefore, a supplier of automobiles may learn of the factors most relevant for searching for a particular automobile. It is noted that the report of FIG. 10 is merely an example. For example, the analytics unit 310 may analyze any type of preference information 112 such as the activated decision-making criteria 112-1, the corresponding weights 112-2, the applied filters 112-3, and the thresholds 112-4, and generate any similar reports.

Figure 11:
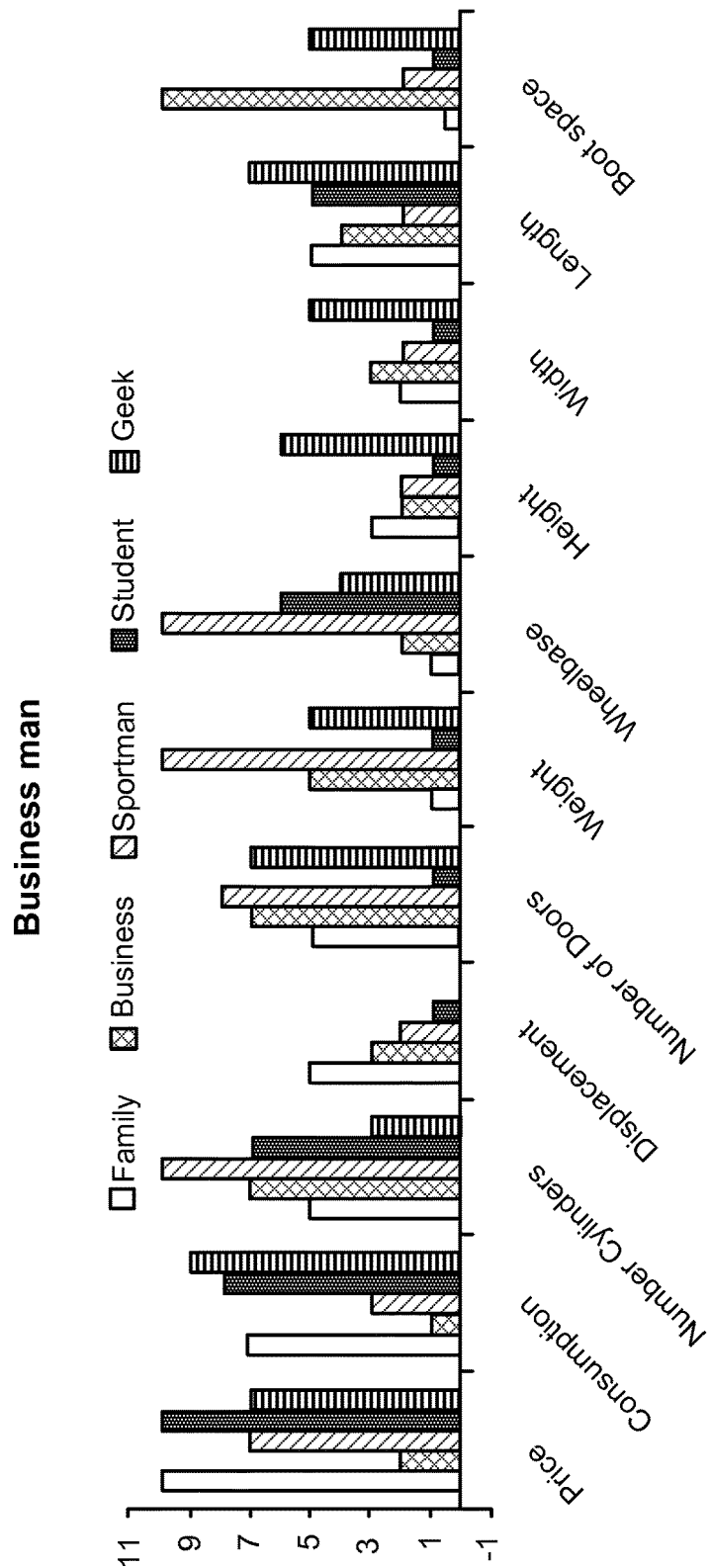
FIG. 11 illustrates an example report generated by the analytics unit according to another embodiment.

FIG. 11 illustrates an example report generated by the analytics unit 310 according to an embodiment. For example, the analytics unit 310 may obtain information providing the differences between the different segments of the population. In this example, the analytics unit 310 analyzed the decision-making criteria 112-1 and its corresponding weight values 112-2 (or intensity levels) across different segments of the population. As such, the report provided by FIG. 11 provides information to the supplier of automobiles regarding the factors that are most relevant for purchases an automobile by various segments of the population.

Figure 12:
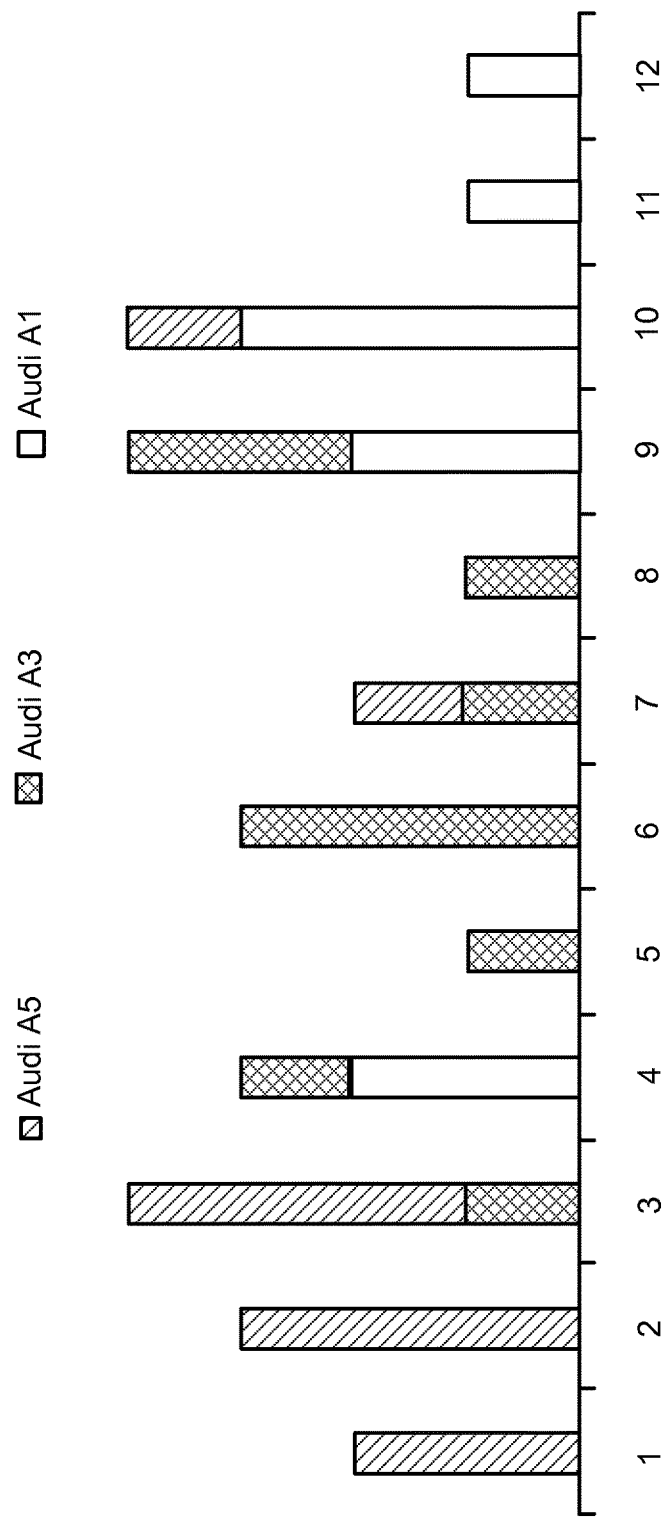
FIG. 12 illustrates an example report generated by the analytics unit according to another embodiment.

FIG. 12 illustrates an example report generated by the analytics unit 310 according to an embodiment. For example, the analytics unit 310 may obtain information on how a specific brand or product is perceived/ranked compared to other brands/products. For example, the analytics unit 310 may track the number of occurrences of a specific brand per rank.

Figure 13:
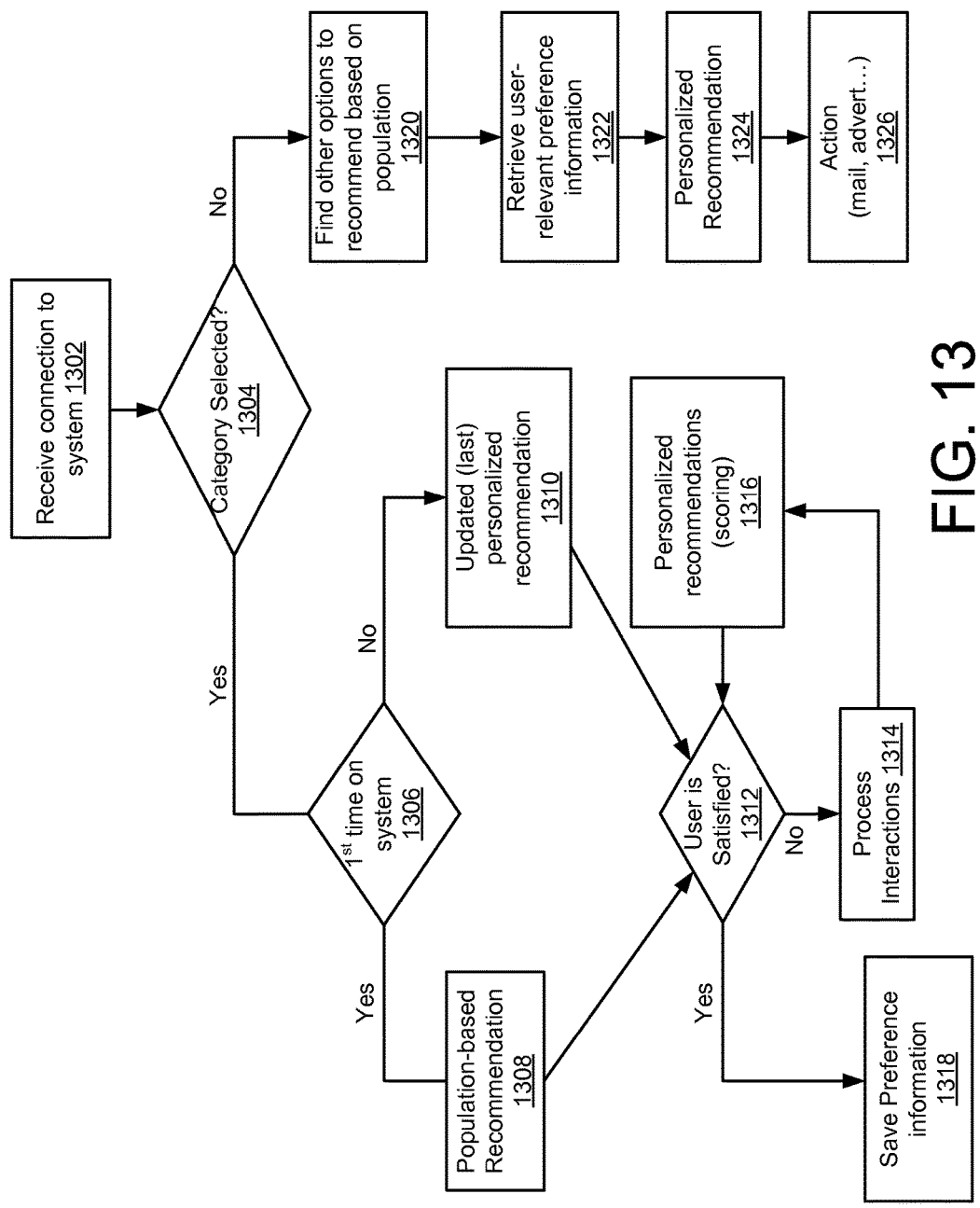
FIG. 13 illustrates a flowchart representing example operations of the system of FIG. 1 according to an embodiment.

FIG. 13 illustrates a flowchart representing example operations of the system 100 of FIG. 1. Although FIG. 13 is illustrated as a sequential, ordered listing of operations, it will be appreciated that some or all of the operations may occur in a different order, or in parallel, or iteratively, or may overlap in time.

A connection to the system may be received (1302). For example, the decision engine 102 (e.g., in particular, the recommendation determining unit 302) may receive a connection to the system 100. For example, a user may log into the system 100, and thereafter the recommendation determining unit 302 may receive the connection to the system 100.

A category may be determined as selected (1304). For example, the decision engine 102 may determine if a particular category relating to a product category or service category is selected. If a category is selected, the operations may proceed with determining the options 105 within the selected category, e.g., operations 1306, 1308, 1310, 1312, 1314, 1316, and 1318. If a category is not selected, the operations may proceed with determining the cross-product recommendations 106 (and possibly the user-specific marketing messages 107), e.g., operations 1320, 1322, 1324, and 1326.

If a product is selected, a determination is made regarding whether or not the user is a first-time user (1306). For example, if the user is a first time user, the population-based recommendation scheme may be used since the system 100 does not have the preference information 112 for the user at this point in time (1308). If the user is not a first time user, the personalized recommendation scheme may be used since the system 100 includes the preference information 112 for at least one previous option problem for the current user (1310).

In more detail, the recommendation determining unit 302 may receive a request for recommendations for a particular product/service category, and determine which recommendation scheme to use (e.g., one of the personal recommendation scheme and the population-based recommend scheme) based on whether the end user is associated with a profile 110 storing the preference information 112 for a previous option problem. For example, the recommendation determining unit 302 may determine whether the end user who issued the request is logged into the system 100 for the first time. If so, the end user does not have any stored preference information 112 associated with its profile 110. For example, the profile 110 does not include the preference information 112 for a previous option problem. In this case, the recommendation determining unit 302 determines that the population-based recommendation scheme should be utilized.

A population-based recommendation scheme is performed (1308). For example, the population-based recommendation unit 304 may perform the population-based recommendation scheme to the scores for the plurality of options 118 based in, in part, the decision-making criterion 112-1 and the corresponding weight values 112-2 for the same option problem, but for other end users. The population-based recommendation unit 304 may perform the population-based recommendation scheme according to the operations described with reference to FIG. 8. Then, the decision engine 102 (through the interaction processing unit 306) may provide the determined options 105 via the display 201, as shown in FIG. 4. The decision engine 102 may provide only the options 118 with the highest calculated score as the determined options 105, which may be the top 5, 10, 15 options.

However, if the recommendation determination unit 302 determines that the end user is associated with a profile 110 storing the preference information 112 for one or more previous option problems, the recommendation determining unit 302 may determine to use the personalized recommendation scheme.

An updated (last) personalized recommendation is performed (1310). For example, the personalized recommendation unit 305 may update the last personalized recommendation for the end user. For example, the personalized recommendation unit 305 may receive the preference information 112 from the profile 110 associated with the end user, and calculate the scores for the options 118 based on the preference information using the score computation operations explained with reference to FIG. 7. Then, the decision engine 102 (through the interaction processing unit 306) may provide the determined options 105 via the display 201, as shown in FIG. 4. The decision engine 102 may provide only the options 118 with the highest calculated score as the determined options 105, which may be the top 5, 10, 15 options.

A determination is made as to whether the user is satisfied (1312). For example, the user may simply select one of the determined options 105 (as shown in FIG. 4) for purchase. However, if the user is not satisfied, the user may interact with website such as the filters 412 and the preference selection area 432 of FIG. 4, and the weight settings (via the setting adjustor 512) of FIG. 5A.

Interactions may be processed (1314). For example, referring to FIG. 4, the user may hover or click on the indicator associated with one of the determined options 105 (e.g., the second option 105-2), and the interaction processing unit 306 may provide the score summary 422 associated with the determined option 105. The score summary 422 may provide the calculated score, the name, address, contact information, as well as any other information associated with the determined option 105.

Based on the user's interactions with the preference selection area 432, the interaction processing unit 306 may receive the selection of the activated decision-making criteria and its assigned importance categories, as well as the ranking information.

In order to obtain the weight values, the transformation unit 307 may transform the assigned importance categories associated with activated decision-making criteria and the ranking information into the weight values. The transformation of the weights by the transformation unit 307 is explained with reference to FIG. 6A.

Personalized recommendation scoring may be performed (1316). For example, based on the weight values obtained from the transformation unit 307, the personalized recommendation unit 305 may update the scores for the plurality of options 118 and provide the updates results to the display 201. In a further embodiment, the end user may view a detailed explanation of the scoring, change one or more weight values associated with the activated decision-making criteria, and view of the updated results. For example, the score report 506 of FIG. 5A may provide an explanation of the score corresponding to a particular determined option 105 including providing a display of the plurality of weight values. For example, as shown in FIG. 5A, upon receipt of a score explanation selection (e.g., activation of the compare button) associated with the second option 105-2, the interaction processing unit 306 may provide the score report 506. Also, the comparison report 560 of FIG. 5B may provide an explanation of the score corresponding to two or more options 105.

In FIG. 5A, the score report 506 may include identification information 508 indicating the determined option 105, a visual indicator 510 illustrating the percentage (or amount) of weight associated with each of the activated decision-making criteria, and a setting adjustor 512 that permits the end user to adjust the weighting applied to the activated decision-making criteria. IN FIG. 5B, the comparison report 560 may include the comparison graph 565 illustrating the weighting for each score of the compared options, and the setting adjustor 512 that permits the end user to adjust the weighting.

According to the embodiments, as the user adjusts the weights via the setting adjustor 512 in FIG. 5A or FIG. 5B, the interaction processing unit 306 in conjunction with the transformation unit 307 may automatically update the visual indicator 510, and the personalized recommendation unit 305 may dynamically change the scores, which may affect which of the determined options 105 are displayed. This makes the recommendation completely transparent to the user. By using the setting adjustor 512, the end user can change the values of the weights in order to perform a what-if analysis and to analyze the sensitivity of the scoring.

Preference Information may be saved (1318). Eventually, the end user will eventually make a booking or a purchase based on the received personal recommendation (e.g. the user is identified as satisfied in 1312). Then, the preference information 112 (e.g., the activated decision-making criteria 112-1, corresponding weights 112-2, applied filters 112-3, and thresholds 112-4) may be saved as the preference information 112 in the profile 110 associated with the end user.

However, if a product category is not selected, other options may be found to recommend based on the population (1320). For example, in this situation, the decision engine 102 may recognize that the recommendation tool is to be used for cross-product recommendations 106 and possibly user-specific marketing messages 107.

For example, as explained with reference to FIG. 9, the marketing manager unit 308 may receive the definition of the target population such as a class of users. In conjunction with the target population, the product/service category may be imposed by the administrator or determined by collaborative filtering methods.

User-relevant preference information may be retrieved (1322). For example, for each user within the defined population, the marketing manager unit 308 may define the corresponding preference information from their profiles 110 in a manner as explained with reference to FIG. 9.

Personalized recommendation may be performed (1324). For example, the marketing manager unit 308 may be configured to calculate the scores for the options 118 based on the preference information obtained in operation 1312 using the scoring computation operations in FIG. 7, and recommend one or more of the highest scored options. As such, based on the scoring, the marketing manager unit 308 may determine the cross-product recommendations 106 for an end user.

An action may be performed (1326). For example, the marketing manager unit 308 may perform an action notifying the end user of the recommendation such as sending an email, display an advertisement, etc. In addition, using the preference information 112, the marketing manager unit 308 may determine user-specific marketing messages 107. For example, the marketing manager unit 308 may tailor the content of the marketing messages to the preferences specified by the user. Based on the activated decision-making criteria 112-1 and the corresponding weight values 112-2, the marketing manager unit 308 may determine which factors are important for a specific user, and then automatically design user-specific marketing messages 107.

Figure 14:
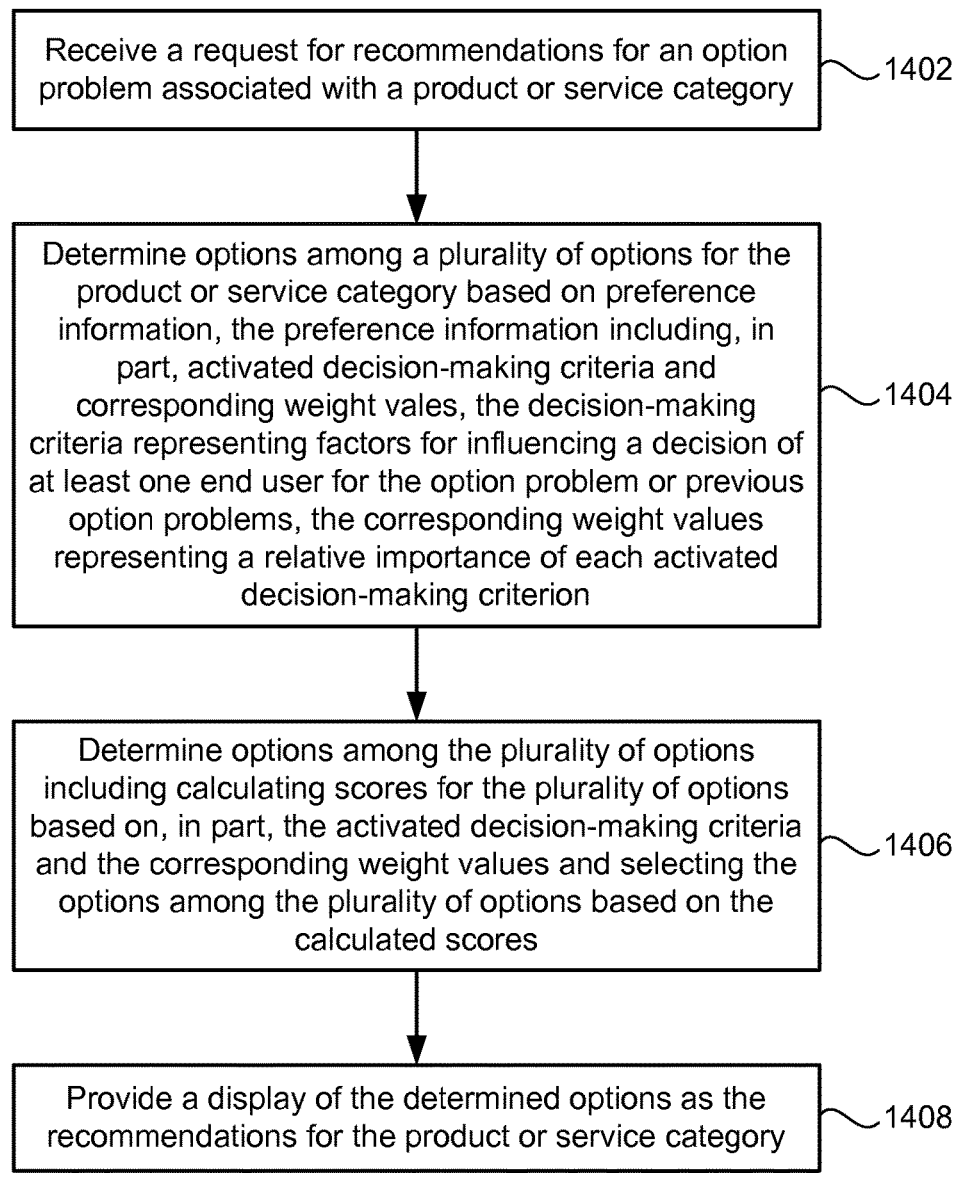
FIG. 14 illustrates a flowchart representing example operations of the system of FIG. 1 according to another embodiment.

FIG. 14 illustrates a flowchart representing example operations of the system 100 of FIG. 1 according to an embodiment. Although FIG. 14 is illustrated as a sequential, ordered listing of operations, it will be appreciated that some or all of the operations may occur in a different order, or in parallel, or iteratively, or may overlap in time.

A request for recommendations for an option problem associated with a product or service category may be received (1402). For example, the decision engine 102 may receive a request for recommendations for an option problem that is associated with a product or service category. In one example, the decision engine 102 may receive a request for recommendations from the end user associated with the profile 110-1. The request may be for recommendations for products/services within a product/service category. In one specific example, the request may be related to recommendations for restaurants, or the request may be related to recommendations for automobiles.

Options among a plurality of options may be determined for the product or service category based on preference information, where the preference information includes, in part, activated decision-making criteria and corresponding weight values, the decision-making criteria representing factors for influencing a decision of at least one end user for the option problem or previous option problems, the corresponding weight values representing a relative importance of each activated decision-making criterion (1404).

For example, the decision engine 102 may receive the plurality of filtered/non-filtered options 118 from the data source 116 pertaining to the request. For example, the decision engine 102 may query and receive the plurality of options 118 relating to restaurants in response to the request. In this context, the plurality of options 118 may represent all (or substantially all) of the filtered/non-filtered restaurants associated with the system 100.

Then, the decision engine 102 may analyze the plurality of options 118, and determine at least a subset of the plurality of options 118 (e.g., the top 10/20/30 options) as the determined options 105 based on the preference information 112 in the profile 110-1 associated with the end user that prompted the request, and/or the preference information 112 associated with one or more profiles 110 from other end users.

If the profile 110-1 does not specify the preference information 112 (e.g., it is the user's first time using the system 100), the decision engine 102 may determine product/service recommendations based on the preference information 112 for other end users. This recommendation scheme may be referred to as the population-based recommendation scheme. If the profile 110-1 does specify the preference information 112 (either for a previous option problem relating to the same product/service category, or for a previous option problem relating to a different product/service category), the decision engine 102 may determine product/service recommendations based on the stored preference information 112 associated with the profile 110-1 for the current end user. This recommendation scheme may be referred to as the personalized recommendation scheme.

The options among the plurality of options may be determined by calculating scores for the plurality of options based on, in part, the activated decision-making criteria and the corresponding weight values and selecting the options among the plurality of options based on the calculated scores (1406).

For example, in order to obtain the determined options 105 from the many available options 118 (according to the population-based recommendation scheme or the personalized recommendation scheme), the decision engine 102 may calculate scores for the plurality of options 118 based on, in part, the decision-making criterion 112-1 and the corresponding weight values 112-2. For instance, the decision engine 102 may calculate a score for each option 118 of the plurality of options 118, where the score represents the relevancy of the corresponding option 118, e.g. a relatively high score will be highly relevant to the end user. Further, the decision engine 102 may utilize the filters 112-3, the thresholds 112-4, the user information 114, as well as another other type of information associated with the system 100 (e.g., the external data sources 104) for calculating the scores for the plurality of options 118. Then, the decision engine 102 may select the options 105 among the plurality of options 118 based on the calculated scores. In one example, the decision engine 102 may select the options 105 with the highest scores, e.g., the options 105 having the top 10/20/30 scores.

A display of the determined options may be displayed as the recommendations for the product or service category (1408). For example, the decision engine 102 may provide the determined options 105 via the display 201 for consideration by the end user such as the screenshots provided by FIGS. 4 and 5.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable medium storing instructions that when executed cause a system to determine decision-making criteria-based recommendations, the instructions comprising instructions to:

store, at an in-memory database system, a plurality of profiles associated with a plurality of users of an e-commerce recommendation website executing on an application server, the in-memory database system being communicatively coupled to the application server, the in-memory database system configured to support real-time analytics and transactional processing including replication and aggregation techniques, the in-memory database system including a decision engine stored in main memory such that logic of the decision engine is pushed down to a database level as opposed to being implemented at the application server, each profile including preference information for one or more option problems, the preference information including, for each option problem, activated decision-making criteria, and importance categories assigned to the activated decision-making criteria, the activated decision-making criteria representing factors for influencing a decision of a respective user, each importance category representing a relative importance of an activated decision-making criterion;

receive, at the application server, over a network, a request for recommendations for a current option problem associated with a product or service category from a computing device of a first user;

select, by the decision engine, one of a personal recommendation scheme and a population-based recommendation scheme based on whether a profile of the first user includes preference information for a previous option problem, wherein the population-based recommendation scheme is selected when the profile of the first user does not include the preference information for the previous option problem, wherein the population-based recommendation scheme includes:

select, by the decision engine, at least one filter having a frequency of usage greater than a first threshold value using the preference information from the plurality of profiles from other users;

select, by the decision engine, at least one activated decision-making criterion that has been activated a number of times greater than a second threshold using the preference information from the plurality of profiles from other users;

determine, by the decision engine, an average importance category for the selected at least one activated decision-making criterion;

compute, by the decision engine, at least one weight value from the average importance category; and calculate, by the decision engine, scores for options that have been filtered with the selected at least one filter based on, in part, the selected at least one activated decision-making criterion and the computed at least one weight value;

determine, by the decision engine, recommendations for the first user among the options based on the calculated scores; and provide, by the application server, over the network, the determined recommendations within a user interface of the computing device of the first user.

2. The non-transitory computer-readable medium of claim 1, wherein the personal recommendation scheme includes:

calculate scores for options based on, in part, the activated decision-making criteria and the corresponding importance categories from the preference information of the first user.

3. The non-transitory computer-readable medium of claim 1, wherein the instructions include instructions to:

provide, over the network, a preference tab that lists a plurality of decision-making criteria associated with the product or service category of the request;

receive, over the network, a selection of activated decision-making criteria among the plurality of decision-making criteria from the computing device of the first user;

receive, over the network, an assignment of an importance category for each activated decision-making criterion from the first user;

re-calculate the scores for the options using the activated decision-making criteria and the assigned importance categories using the personal recommendation scheme; and re-select the recommendations among the options based on the calculated scores.

4. The non-transitory computer-readable medium of claim 3, wherein the instructions include instructions to:

provide, over the network, a score for a particular recommendation;

provide, over the network, a visual indicator that graphically depicts a percentage of a weighting associated with each activated decision-making criterion selected by the first user with respect to the particular recommendation;

receive, over the network, an adjustment to the weighting of at least one of the activated decision-making criteria via a sliding scale displayed on the user interface of the computing device; and re-compute the scores for the options using the adjusted weighting; and re-select the recommendations among the options based on the re-computed scores.

5. The non-transitory computer-readable medium of claim 1, wherein the instructions include instructions to:

analyze the preference information of the plurality of profiles for a particular product or service category by determining the factors relevant for influencing decisions of the plurality of users for the particular product or service category; and generate a report that provides a graphical representation of a percentage of each factor's relevance for influencing the decisions of the plurality of users for the particular product or service category.

6. The non-transitory computer-readable medium of claim 1, wherein the instructions include instructions to:

determine a cross-product or cross-service recommendation for the first user based on the preference information for the first user and the preference information of other users; and notify, over the network, the first user of the determined cross-product or cross-service recommendation.

7. A computer-implemented method for decision-making criteria-based recommendations, the method comprising:

storing, at an in-memory database system, a plurality of profiles associated with a plurality of users of an e-commerce recommendation website executing on an application server, the in-memory database system being communicatively coupled to the application server, the in-memory database system configured to support real-time analytics and transactional processing including replication and aggregation techniques, the in-memory database system including a decision engine stored in main memory such that logic of the decision engine is pushed down to a database level as opposed to being implemented at the application server, each profile including preference information for one or more option problems, the preference information including, for each option problem, activated decision-making criteria, and importance categories assigned to the activated decision-making criteria, the activated decision-making criteria representing factors for influencing a decision of a respective user, each importance category representing a relative importance of an activated decision-making criterion;

receiving, at the application server, a request for recommendations for a current option problem associated with a product or service category from a computing device of a first user;

selecting, by the decision engine, one of a personal recommendation scheme and a population-based recommendation scheme based on whether a profile of the first user includes preference information for a previous option problem, wherein the population-based recommendation scheme is selected when the profile of the first user does not include the preference information for the previous option problem, wherein the population-based recommendation scheme includes;

selecting, by the decision engine, at least one filter having a frequency of usage greater than a first threshold value based on the preference information from the plurality of profiles from other users;

selecting, by the decision engine, at least one activated decision-making criterion that has been activated a number of times greater than a second threshold value using the preference information from the plurality of profiles from the other users;

determining, by the decision engine, an average importance category for the selected at least one activated decision-making criterion;

computing, by the decision engine, at least one weight value from the average importance category; and calculating, by the decision engine, scores for options that have been filtered with the selected at least one filter based on, in part, the selected at least one activated decision-making criterion and the computed at least one weight value; and determining, by the decision engine, recommendations for the first user among the options based on the calculated scores; and providing, by the application server, the determined recommendations within a user interface of the computing device of the first user.

8. The method of claim 7, further comprising;

upon activation of a comparison selection control on the user interface of the computing device of the first user, providing, over the network, differences between two or more recommendations in terms of their calculated scores broken down by percentage of decision-making criteria.

9. A system for decision-making criteria-driven recommendations, the system comprising:

an application server configured to execute an e-commerce recommendation website, the application server configured to interface with an application of a computing device; and an in-memory database system comprising at least one processor configured to interface with the application server, the in-memory database system configured to support real-time analytics and transactional processing including replication and aggregation techniques, the in-memory database system storing a plurality of profiles associated with a plurality of users of the e-commerce recommendation website, each profile including preference information for one or more option problems, the preference information including, for each option problem, activated decision-making criteria, and importance categories assigned to the activated decision-making criteria, the decision-making criteria representing factors for influencing a decision of a respective user, each importance category representing a relative importance of an activated decision-making criterion, the in-memory database system including a decision engine stored in main memory such that logic of the decision engine is pushed down to a database level as opposed to being implemented at the application server, the decision engine having circuitry and a non-transitory computer-readable medium storing executable instructions that when executed by the circuitry cause the decision engine to:

receive, over a network, a request for recommendations for a current option problem associated with a product or service category from the computing device of a first user;

select one of a personal recommendation scheme and a population-based recommendation scheme based on whether a profile of the first user includes preference information for a previous option problem, wherein the population-based recommendation scheme is selected when the profile of the first user does not include the preference information for the previous option problem;

calculate scores for options according to either the personal recommendation scheme or the population-based recommendation scheme;

determine recommendations for the first user among the options based on the calculated scores; and provide, over the network, the determined recommendations within a user interface of the computing device of the first user, wherein the decision engine, when executing the population-based recommendation scheme, is configured to:

select at least one filter having a frequency of usage greater than a first threshold value based on the preference information from the plurality of profiles of other users;

select at least one activated decision-making criterion that has been activated a number of times greater than a second threshold value using the preference information from the plurality of profiles from the other users;

determine an average importance category for the selected at least one activated decision-making criterion;

compute at least one weight value from the average importance category; and calculate scores for options that have been filtered with the selected at least one filter based on, in part, the selected at least one activated decision-making criterion and the computed at least one weight value.

10. The system of claim 9, wherein the decision engine, when executing the personal recommendation scheme, is configured to:

calculate scores for the options based on, in part, the activated decision-making criteria and the corresponding importance categories from the preference information of the first user.

11. The system of claim 9, wherein the decision engine is configured to:

provide, over the network, a preference tab that lists a plurality of decision-making criteria associated with the product or service category of the request;

receive, over the network, a selection of activated decision-making criteria among the plurality of decision-making criteria from the computing device of the first user;

receive, over the network, an assignment of an importance category for each activated decision-making criterion from the computing device of the first user;

re-calculate the scores for the options using the activated decision-making criteria and the assigned importance categories using the personal recommendation scheme; and re-select the recommendations among the options based on the calculated scores.

12. The system of claim 11, wherein the decision engine is configured to:

provide, over the network, a score for a particular recommendation, and a visual indicator that graphically depicts a percentage of a weighting associated with each activated decision-making criterion selected by the first user for the particular recommendation;

receive, over the network, an adjustment to the weighting of at least one of the activated decision-making criteria via a sliding scale displayed on the user interface of the computing device of the first user;

re-compute the scores for the options using the adjusted weighting; and re-select the recommendation among the options based on the re-computed scores.

13. The system of claim 9, wherein the decision engine is configured to:

analyze the preference information of the plurality of profiles for a particular product or service category by determining the factors relevant for influencing decisions of the plurality of users for the product or service category; and generate a report that provides a graphical representation of a percentage of each factor's relevance for influencing the decisions of the plurality of users for the particular product or service category.

14. The system of claim 9, wherein the decision engine is configured to:

determine a cross-product or cross-service recommendation for the first user based on the preference information for the first user and the preference information of other users; and notify, over the network, the first user of the determined cross-product or cross-service recommendation.

15. The system of claim 9, wherein the decision engine is configured to receive external factors that may influence the decision of the first user, the external factors including weather information for one or more locations of the options, and customer-review information for one or more of the options, wherein the decision engine is configured to calculate the scores for the options using the external factors within either the population-based recommendation scheme or the personal recommendation scheme.

16. The system of claim 9, wherein the decision engine, when computing the scores for the options for the personal recommendation scheme, is configured to:

compute a pairwise preference degree for each pair of options of the options for each activated decision-making criterion, the preference degree representing a level of preference between a first option and a second option of each pair on each activated decision-making criterion;

compute a uni-criterion score for each first option based on the preference degrees;

compute a weighted global score for each first option based on the uni-criterion score and a corresponding weight value; and rescale the weighted global score for each first option, and output the rescaled weighed global score for each option as the calculated scores for the options.

17. The system of claim 9, wherein the user interface defines a list of selectable decision-making criteria, and an importance category section that identifies a first importance category, a second importance category, and a third importance category, wherein each of the selectable decision-making criteria from the list is configured to be selected and moved into one of the first importance category, the second importance category, and the third importance category.

* * * * *